United States Patent
Battaje et al.

(10) Patent No.: US 10,037,273 B2
(45) Date of Patent: Jul. 31, 2018

(54) UNIFIED PAGING SCHEME FOR DENSE AND SPARSE TRANSLATION TABLES ON FLASH STORAGE SYSTEMS

(71) Applicant: HGST Netherlands B.V., Amsterdam (NL)

(72) Inventors: Ajith Kumar Battaje, Karnataka (IN); Tanay Goel, Chhattisgarh (IN); Sandeep Sharma, Karnataka (IN); Saurabh Manchanda, Delhi (IN); Arun Kumar Medapati, Andhra Pradesh (IN)

(73) Assignee: HGST Netherlands B.V., Amsterdam (NL)

( * ) Notice: Subject to any disclaimer, the term of this patent is extended or adjusted under 35 U.S.C. 154(b) by 111 days.

(21) Appl. No.: 15/197,116

(22) Filed: Jun. 29, 2016

(65) Prior Publication Data
US 2018/0004650 A1    Jan. 4, 2018

(51) Int. Cl.
*G06F 12/02*    (2006.01)
*G06F 12/1009*  (2016.01)
*G06F 17/30*    (2006.01)

(52) U.S. Cl.
CPC ...... *G06F 12/0246* (2013.01); *G06F 12/1009* (2013.01); *G06F 17/30958* (2013.01); *G06F 2212/1016* (2013.01); *G06F 2212/1056* (2013.01); *G06F 2212/152* (2013.01); *G06F 2212/214* (2013.01); *G06F 2212/657* (2013.01); *G06F 2212/7201* (2013.01); *G06F 2212/7202* (2013.01)

(58) Field of Classification Search
CPC ............ G06F 12/0246; G06F 12/1009; G06F 17/30958; G06F 2212/1016; G06F 2212/1056; G06F 2212/152; G06F 2212/214; G06F 2212/657; G06F 2212/7201; G06F 2212/7202
See application file for complete search history.

(56) References Cited

U.S. PATENT DOCUMENTS

| | | |
|---|---|---|
| 6,510,488 B2 | 1/2003 | Lasser |
| 6,782,446 B2 | 8/2004 | Akey et al. |
| 7,103,748 B2 | 9/2006 | Day et al. |
| 7,761,740 B2 | 7/2010 | Kern et al. |
| 8,209,463 B2 | 6/2012 | Tzeng |

(Continued)

OTHER PUBLICATIONS

Gupta et al., "DFTL: A Flash Translation Layer Employing Demand-based Selective Caching of Page-level Address Mappings" dated Aug. 2008 <Retrieved from http://www.cse.psu.edu/~buu1/papers/ps/DFTL-TR.pdf> 31 pages.

(Continued)

*Primary Examiner* — Yong Choe
(74) *Attorney, Agent, or Firm* — Patent Law Works LLP

(57) ABSTRACT

A system comprising a processor and a memory storing instructions that, when executed, cause the system to receive a first translation table entry for a logical block, map the first translation table entry to a first dump unit, the first dump unit included in an array of dump units, identify a second translation table entry for the logical block in the first dump unit, the second translation table entry also being stored in a storage device, and generate a linked list in the storage device from the second translation table entry associated with the first dump unit, the linked list identifying previous translation table entries associated with the logical block.

23 Claims, 25 Drawing Sheets

(56) References Cited

U.S. PATENT DOCUMENTS

| | | |
|---|---|---|
| 8,321,652 B2 | 11/2012 | Hinz |
| 8,352,706 B2 | 1/2013 | Yano et al. |
| 2014/0052899 A1 | 2/2014 | Nan |

OTHER PUBLICATIONS

Kale et al., "An Innovative Algorithm for Flash memory" dated 2012 <Retrieved from http://www.ijcsit.com/docs/Volume%203/vol3Issue3/ijcsit20120303113.pdf> International Journal of Computer Science and Information Technologies, vol. 3, 6 pages.

Researchgate "A superblock-based flash translation layer for NAND flash memory" dated Jan. 2006 <Retrieved from http://www.researchgate.net/publication/220800871_A_superblock-based_flash_translation_layer_for_NAND_flash_memory> 11 pages.

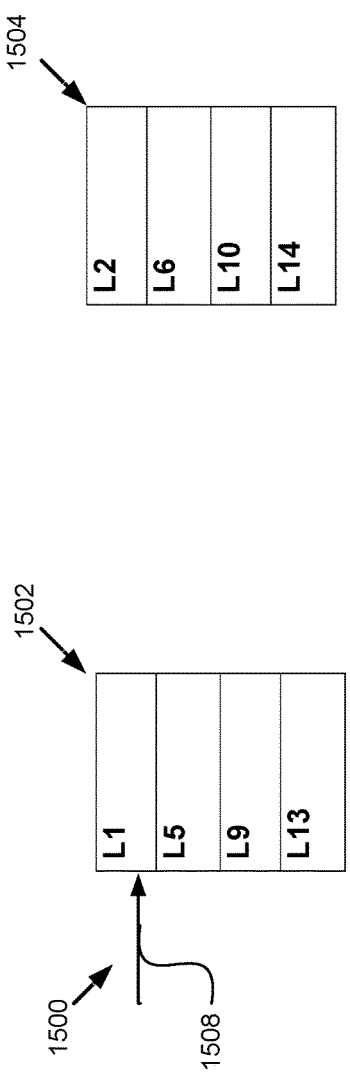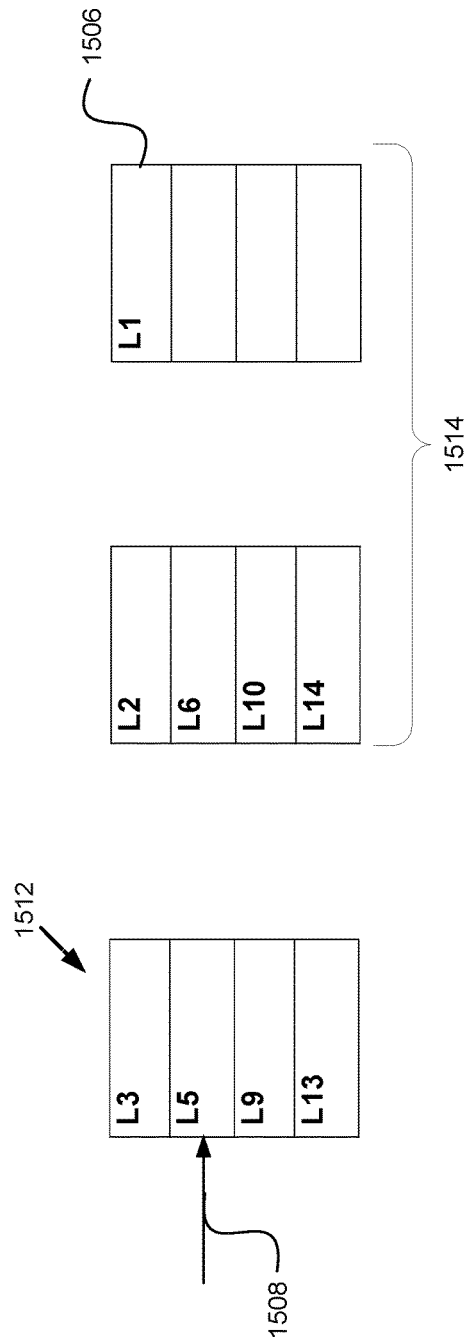
Figure 15A
Figure 15B

UNIFIED PAGING SCHEME FOR DENSE AND SPARSE TRANSLATION TABLES ON FLASH STORAGE SYSTEMS

BACKGROUND

The present disclosure relates to a general unified paging method for translation tables. In particular, the present disclosure relates to storing the bulk of translation structures in a storage system, while keeping a small subset in the memory. Still more particularly, the present disclosure relates to addressing a large translation structure in limited flash memory.

A flash device due to erase-before-write characteristic needs a dynamic translation table that keeps track of latest mapping of a logical block to physical block. As and when logical blocks are overwritten, the translation table is updated to point to the new physical block and the old physical blocks are reclaimed by a process known as garbage collection.

Translation tables can be implemented differently for different use cases and can be broadly classified as dense and sparse. A dense translation table optimizes memory consumption based on the usage pattern where a range of logical blocks is populated. The dense translation table utilizes contiguous memory for a range of blocks and uses the logical block numbers (or transformations thereof) as indices into the table. Sparse translation tables, on the other hand, are exemplified by a large (say, 64 bit or higher) address range that is sparsely populated without a discernible pattern. Index based lookups are less attractive compared to hash and match type data structures and each logical block number is explicitly stored as part of translation table entry to enable the match based lookups. Depending on the system implementation, translation tables can be used to store additional per block information (besides the logical to physical translation) such as CRC, access statistics, and the like.

The total size of the translation data structure (or table) in a storage system is governed by the expected number of translation entries, size of each entry, and data structure requirements. As the storage capacity continues to increase fueled by storage density increases, large aggregations of devices, data reduction technologies like compression, and enhanced use cases, the translation data structures may reach sizes where it is not feasible (technologically or economically) to store the entire structure in the memory (DRAM). The translation process is critical to the storage device performance and reliability. Therefore, there remains a need for a system that resolves the conflict presented by the need for quick and reliable access to the translation tables and while limiting the amount of memory (DRAM) that it consumes.

SUMMARY

The present disclosure relates to systems and methods for a general unified paging method for translation tables. According to one innovative aspect of the subject matter in this disclosure, a system has one or more processors and a memory storing instructions that, when executed, cause the system to: receive a first translation table entry for a logical block; map the first translation table entry to a first dump unit, the first dump unit included in an array of dump units; identify a second translation table entry for the logical block in the first dump unit, the second translation table entry being stored in a storage device; and generate a linked list in the storage device from the second translation table entry associated with the first dump unit, the linked list identifying previous translation table entries associated with the logical block.

In general, another innovative aspect of the subject matter described in this disclosure may be implemented in methods that include: receiving a first translation table entry for a logical block; mapping the first translation table entry to a first dump unit, the first dump unit included in an array of dump units; identifying a second translation table entry for the logical block in the first dump unit, the second translation table entry being stored in a storage device; and generating a linked list in the storage device from the second translation table entry associated with the first dump unit, the linked list identifying previous translation table entries associated with the logical block.

Other implementations of one or more of these aspects include corresponding systems, apparatus, and computer programs, configured to perform the actions of the methods, encoded on computer storage devices.

These and other implementations may each optionally include one or more of the following features.

For instance, the features may include that mapping of the first translation table entry is based on a hash function, the mapping being a hash of on a logical block number of the logical block of the first translation table; that mapping includes storing the first translation table entry in the first dump unit; and that the linked list includes updates to the logical block in a reverse chronological order, a most recent update being at the front of the linked list.

For instance, the operations further include: allocating a space in memory for the array of dump units; grouping the array of dump units into a plurality of dump groups; assigning a fixed range of the logical space in the memory to each dump group in the plurality of dump groups; receiving a write request for the logical block, the write request including a new translation table entry for the logical block; identifying the first dump unit associated with the logical block; updating the second translation table entry in the storage device with the first translation table entry from the first dump unit; storing the new translation table entry in the first dump unit; updating the linked list in the storage device, the linked list referencing the first translation table entry in the storage device through previous translation table entries associated with the logical block; and eliminating duplicate entries for the logical block to get a consolidated representation of translation table entries on the storage device.

These implementations are particularly advantageous in a number of respects. For instance, the technology describes herein can be used for implementing a general unified paging method for translation tables. The general unified paging method dynamically stores and retrieves translation structures to/from storage media and thus minimizes DRAM (memory) footprint. The general unified paging method also provides support for low latency write operations without incurring the cost of lookup from the storage media. The systems and methods described herein stores translation data structures in the storage media as user data as opposed to system data, which requires no special handling (e.g., garbage collection, wear-leveling, read disturb tracking) for translation structures.

It should be understood that language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

FIGS. 15A and 15B are example graphical representations to showing paged translation maps are preserved in the memory to increase their usage, according to the techniques described herein.

DETAILED DESCRIPTION

Figure 1:
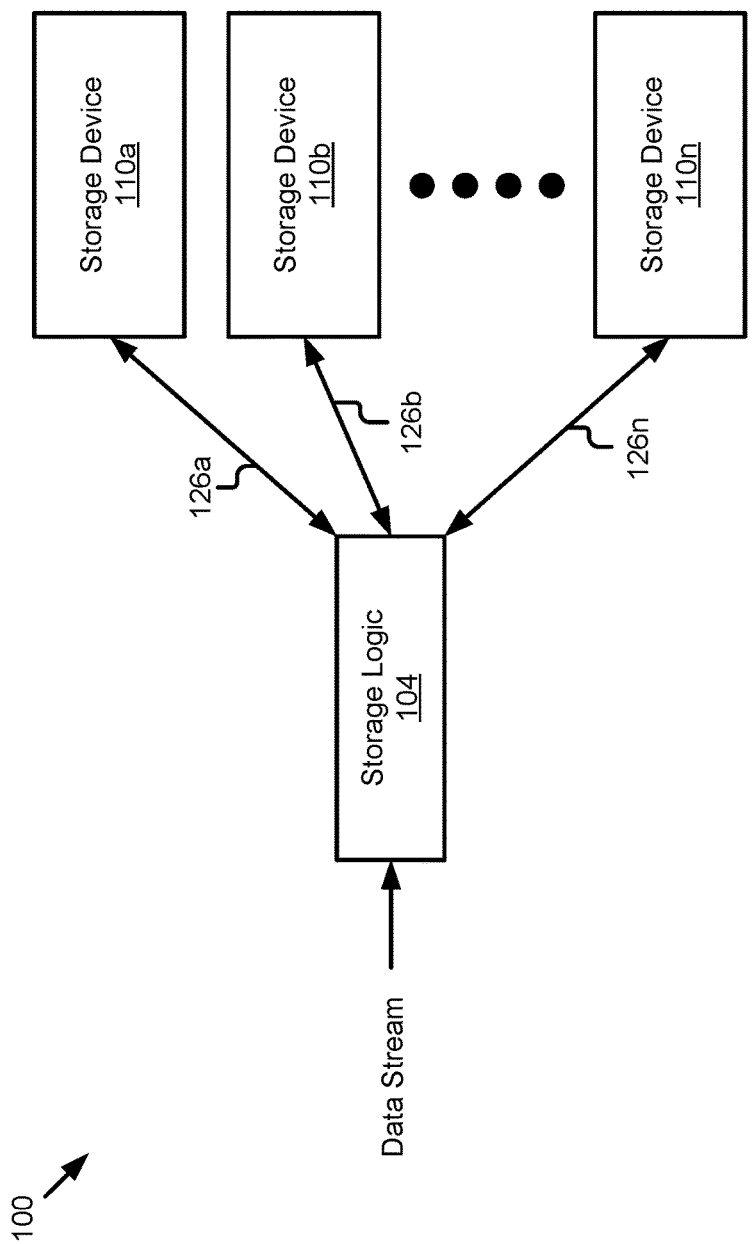
FIG. 1 is a high-level block diagram illustrating an example system for implementing a general unified paging method for translation tables according to the techniques described herein.

Systems and methods for implementing a general unified paging method for translation tables are described below. In particular, in the present disclosure, systems and methods for addressing various issues related to the unified paging method and specifically in flash-storage devices are described below. While the systems, methods of the present disclosure are described in the context of particular system architecture that uses flash-storage, it should be understood that the systems and methods can be applied to other architectures and organizations of hardware.

Overview

The present disclosure relates to a general unified paging method for translation tables. In particular, the present disclosure describes systems and methods for storing the bulk of translation structures in a storage system, while keeping a small subset in the memory. Still more particularly, the present disclosure describes systems and methods that solve issues arising out of implementing a large translation structure in limited flash memory.

The present disclosure aims at solving the issues of speed, reliability, durability and sparsity of translation tables. File systems rely significantly on the locality of reference for their performance and the worst-case behavior can require multiple dependent media accesses. The present disclosure treats the translation table entries similar to user data. Consequently, the start-up process resolves circular dependencies when populating reading translation table entries from persistent media (which in-turn requires various translation entries to be present beforehand). The start-up process recreates the translation data structures such that the translation subsystem operates strictly within a restricted DRAM limit (the limit is the same as the limit that existed before shutdown).

Translation structure sizing depends on the unit of allocation (the "block size"). In most modern SSDs, block size of 4 KB is commonly seen. The following factors contribute to the size of the translation structure—the capacity of the storage device or system. A larger device can store more data, and would correspondingly have a larger number of translation entries. For example, a 4 TB device with a 4 KB block size will have 4 TB/4 KB=$2^{30}$ entries at most. If data reduction techniques such as compression are deployed, the same device can store more data. For example, for an average compression ratio of 2:1, the number of entries in the above example would double to $2^{31}$. The choice of the data structure to implement the translation tables may be a linearly indexed array (Table[L]=P).

The size of the translation tables is typically expressed as a fraction of the device size. Linearly indexed arrays are typically in the range of 0.1%, while hashed sparse structures can be implemented with sizes in the range 0.2%-0.5% without data reduction, with a corresponding amplification for data reduction. A translation table implemented for flash based system would need to handle the media property of not being able to do in-place update and hence treating translation table entries as special entities involves additional implementation overhead with respect to various media specifics like garbage collection, wear-levelling, read-disturb, retention etc.

Furthermore, when a particular translation table entry is not present in memory, the entry has to be looked up in storage media for which there needs to be a way to find the location on storage media to search the mapping for. For dense translation tables, a simple mapping can be created that maps a given logical block number to fixed location on storage media. As an example, the logical address space would be identical to physical address space, for dense translation tables. For a sparse translation table, an 80 bit logical block number address space with each translation entry consuming 16 bytes, would require $2^{80}*16=2^{84}$ bytes of logical address space reserved for storing translation table entries, with fixed mapping.

Storage (flash storage) systems are expected to exhibit low latencies for latency sensitive applications that use these storage systems. The read latency is mostly media characteristic dominated. With use of power safe/capacitor backed SRAM as cache for recently written data, write latency can be minimized independent of media characteristics. However, on a system that has a paged translation structure, it is possible that a write request is received on a logical block that does not have its translation entry in memory in which case an implementation would involve fetching the on-media translation entry and then modifying the entry corresponding to the new location where data is written. This implementation incurs a read latency for a write operation that is undesired.

In some embodiments, since translation table maps are periodically persisted, there exists a window of vulnerability after the creation of a map entry and before it has been persisted—during this window, an unplanned power outage can cause information (and data) to be lost. In some embodiments, the persistence of maps is not synchronized—reverse map is persisted based on locality parameters, forward map is synchronized whenever there is memory pressure or enough map entries have been accumulated.

In virtual memory management systems, the translation table is always memory resident with the last level of translation pointing to a memory address or a swap area address. In contrast, the translation tables are partially resident on storage media. Typical file systems are built on top of a media abstraction that allows in-place overwrite of any data.

In some embodiments, a typical implementation of garbage collection system involves identifying a physical area on storage media to flash to garbage collect and then query for all the logical blocks that fall on this physical area of flash. The query involves some implementation of a reverse map structure (that maps physical location to logical block numbers) and then a validation step with forward map structure. The reverse map structures are typically not strictly up-to-date and hence the information from reverse map structure is validated with the forward map structure to decide on the physical locations that are still valid and need the data to be moved. The garbage collection needs to preserve attributes associated with the logical block for which the typical implementation is to query the forward map.

Whenever translation table crosses the threshold memory consumption limit, translation table entries need to be purged from memory. Only persisted translation table entries can be purged from memory. This means the entries to be purged must be first written to storage media before purging from memory. The selection of entries to be written to storage media determines the input/output efficiency of writing to storage media. This aspect is relevant since tracking of translation table entries is in form of chunks (in our implementation dump unit is a chunk) and hence every chunk in the system at any point of time may have a mix of non-persisted and persisted entries and hence it is important to select chunks that has a good fraction of non-persisted entries. The selection of entries to purge must consider spatial and temporal locality exhibited by typical workloads.

A. Unified Paging Scheme for Dense and Sparse Translation Tables on Flash Storage Systems The translation table entries are treated similar to user data written to a reserved logical space which is not available to user. The logical space reservation can be implemented through a dedicated partition/namespace. Treating translation table entries similar to user data implies the location where translation table entries are dumped can be reached only through the translation table. To avoid circular dependencies here, the translation map entries for logical block locations corresponding to translation table dump are pinned in memory so that they are always resident in memory.

In one embodiment, the system has a dynamically updated look up structure referred to as a map dump table. The map dump table consists of the following:

a. Dump unit—This is smallest unit at which the map dump table maintains mapping from logical block to storage media location where translation entries are dumped. A logical block is mapped to a particular dump unit using a hash function.

b. Dump group—In order to have efficient media lookup, the dump unit must be as small as possible so that minimal input/output would need to be done to fetch translation entry for a given logical block. A dump group is a collection of fixed number of dump units that when dumped are dumped together for write input/output efficiency.

c. Dump group logical space reservation—The logical space reserved for translation table dumps are divided into fixed size regions with each region assigned to a dump group. This division provides ease of management.

d. Reverse linked list of dump units—A given dump unit may be dumped multiple times based on usage pattern with each dump unit having a disjoint set of entries. To keep track of all active locations where a dump unit is dumped, a reverse linked list starting from map dump table is maintained.

An example of the map dump unit is described in more detail below with reference to FIG. 9.

B. Incremental Snapshot Based Technique on Paged Translation Systems

A snapshot marker can be implemented in different embodiments including different functions. Some embodiments may include: 1) A free running counter denoting time—A timestamp of sufficient granularity associated with a map entry can allow determining older vs. newer entries; 2) A counter associated with reverse map updates—Each time a reverse map is persisted, a counter is incremented; and 3) A counter associated with meta-log entries—Each time a new map entry is created, the counter is incremented. In some embodiments, the meta-log entries are entries from a journal of recent logical map to physical map updates that have not yet been persisted in a reverse translation map.

A forward map dump unit is the smallest unit at which the forward map dump table maintains mappings from logical block to storage media location where translation entries are dumped. At reconstruction time, the saved value of the forward map dump units is retrieved. In some embodiments, the map dump table compactly describes the saved value of the snapshot marker for each dump unit. Therefore the system looks for map entries that were created after the snapshot marker had that value. The other sources of map information are reverse-map chunks and meta-log entries. Based on the recorded snapshot marker values therein, it is efficient to determine whether a given reverse-map chunk or meta-log entry would contribute to the eventual forward map. This significantly accelerates map reconstruction—processing a large part of the reverse map (created before the snapshot marker had the said value) can be avoided.

C. Checkpoint Based Technique for Bootstrapping Forward Map Under Constrained Memory for Flash Devices On systems with a paged forward map, a subset of the forward map is resident in storage media while the other subset is resident in memory with continuous flow of entries back and forth between storage media and memory. A snapshot intends to capture the memory resident map entries that have not yet been persisted to storage media to be able to recreate the memory resident state on boot-up after a planned or unplanned shutdown.

A snapshot of the translation table includes the map dump table and the non-persisted maps (maps that are not backed up in storage media and need to be persisted before they can be purged from memory). The system periodically takes a snapshot of the translation table and persists it in storage media. Between two consecutive snapshots, there is a time window where updates to the translation table may happen. These updates, after the last snapshot, need to be obtained from meta-log and/or reverse map. To remember the portion of reverse-map and meta-log, which was updated after the last snapshot is taken, the systems and methods of the present disclosure to add a checkpoint.

A checkpoint can be implemented in different embodiments including different functions. Some embodiments may include: 1) A free running counter denoting time—A timestamp of sufficient granularity associated with a map entry can allow determining older vs. newer entries; 2) A counter associated with reverse map updates—Each time a reverse map is persisted, a counter is incremented; and 3) A counter associated with meta-log entries—Each time a new map entry is created, the counter is incremented.

D. Translation Lookup and Garbage Collection Optimizations on Storage System with Paged Translation Table In some embodiments, implementing the present disclosure with garbage collection can be performed as described below. A bitmap may be maintained with a bit per physical block. In some embodiments, the size of the bitmap may be limited by the physical size of the storage device and is not dependent on the large logical space that a sparse translation structure supports.

Whenever a physical block is assigned to a logical block, the corresponding bit is turned ON and whenever the logical block is overwritten (hence invalidating the previously mapped physical block), the corresponding bit is turned OFF. Garbage collection selects the physical chunk to relocate and using the bitmap and filters out only those physical blocks that have the bit turned ON. These are the only blocks that needed to be relocated, since all other blocks are implicitly holding data that has been overwritten with newer data.

E. Efficient Management of Paged Translation Maps in Memory and Flash

When maps are purged from memory as part of memory-reclaim process, it is important to be able to figure out which maps to preserve in memory, and which maps to page out. This disclosure proposes an approach to efficiently track the maps in a dump-unit, and to separate the frequently accessed maps from the rarely accessed ones. It also makes the memory-reclaim process faster by grouping the rarely accessed maps together for faster removal. In some embodiments, the system maintains statistics on a per-dump-group basis, that counts how many maps are present in each dump group, how many of these maps are currently non-persisted in storage media and how many of these are not allowed to be purged from memory. For each dump group, a linked-list pointer is also stored that allows the dump group to be attached to a linked list. A multi-level linked-list data structure is used to categorize the dump groups. Each linked list holds the dump groups that satisfy a certain pre-defined criteria for that list. Then each of the dump groups is evaluated and added to one of the lists. In some embodiments, the criteria for the linked lists is chosen to be the number of non-persisted maps present in the dump group and the non-persisted-to-total maps ratio for the dump group. In some embodiments, the non-persisted maps are also alternatively referred to as dirty entries. As the number of non-persisted maps changes in a dump group, the present disclosure re-evaluates if the dump group needs to be migrated to some other list. This way, each of the dump groups is always loosely sorted in its respective linked list.

System

FIG. 1 is a high-level block diagram illustrating an example system 100 for managing translation tables according to the techniques described herein. In the depicted embodiment, the system 100 may include storage logic 104 and one or more storage devices 110a, 110b through 110n. In the illustrated embodiment, the storage logic 104 and the one or more storage devices 110a, 110b through 110n are communicatively coupled. However, the present disclosure is not limited to this configuration and a variety of different system environments and configurations can be employed and are within the scope of the present disclosure. Other embodiments may include additional or fewer components. It should be recognized that FIG. 1 as well as the other figures used to illustrate an embodiment, and an indication of a letter after a reference number or numeral, for example, "110a" is a specific reference to the element or component that is designated by that particular reference numeral. In the event a reference numeral appears in the text without a letter following it, for example, "110," it should be recognized that such is a general reference to different embodiments of the element or component bearing that general reference numeral.

In some embodiments, the storage logic 104 provides translation table management schemes. The storage logic 104 can provide computing functionalities, services, and/or resources to send, receive, read, write, and transform data from other entities of the system 100. In some embodiments, the storage logic 104 can be a computing device configured to make a portion or all of the storage space available on storage devices 110. In some embodiments, the storage logic 104 receives a data stream as input. In other embodiments, the storage logic 104 transmits data between the storage devices 110. It should be recognized that multiple storage logic units 104 can be utilized, either in a distributed architecture or otherwise. For the purpose of this application, the system configuration and operations performed by the system are described in the context of a single storage logic 104.

The storage devices 110a, 110b through 110n, may include a non-transitory computer-usable (e.g., readable, writeable, etc.) medium, which can be any non-transitory apparatus or device that can contain, store, communicate, propagate or transport instructions, data, computer programs, software, code routines, etc., for processing by or in connection with a processor. In some embodiments, the storage devices 110a, 110b through 110 communicate and cooperate with the storage logic 104 via signal lines 126a, 126b though 126n. While the present disclosure reference to the storage devices 110 as flash memory, it should be understood that in some embodiments, the storage devices 110 may include a non-transitory memory such as a dynamic random access memory (DRAM) device, a static random access memory (SRAM) device, or some other memory devices.

Figure 2:
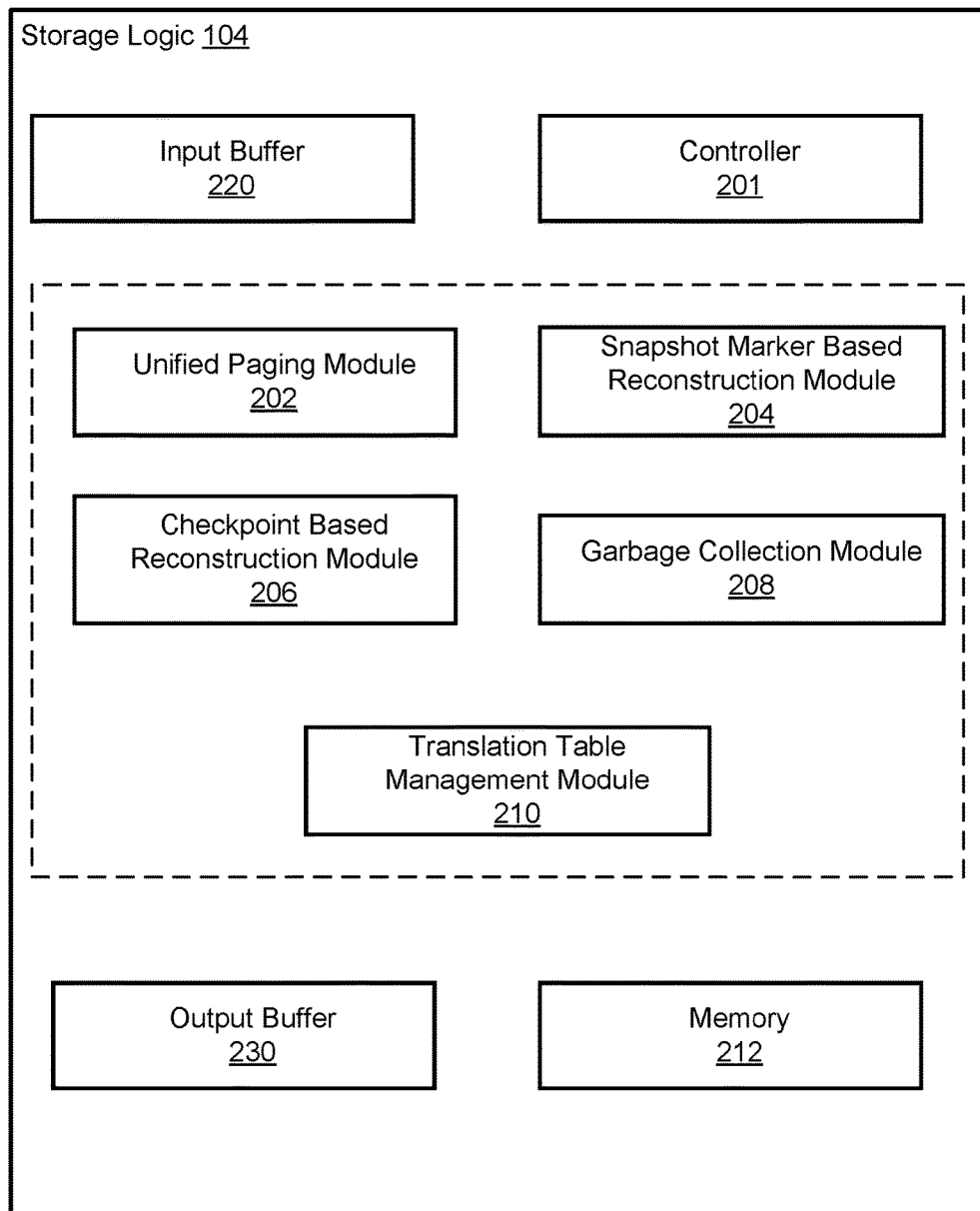
FIG. 2 is a block diagram illustrating an example of storage logic according to the techniques described herein.

FIG. 2 is a block diagram illustrating an example of storage logic 104 according to the techniques described herein. The storage logic 104 is combinational logic, firmware, software, code, or routines or some combination thereof for implementing cross device redundancy schemes. As depicted in FIG. 2, the storage logic 104 may include an input buffer 220, a controller 201, a unified paging module 202, a snapshot marker based reconstruction module 204, a checkpoint based reconstruction module 206, a garbage collection module 208, a translation table management module 210, an output buffer 230, and a memory 212 which may be electronically communicatively coupled by a communication bus (not shown) for cooperation and communication with each other. These components 220, 201, 202, 204, 206, 208, 210, 230 and 212 are also coupled for communication with the other entities (e.g., storage devices 110) of the system 100.

In one embodiment, the input buffer 220, the controller 201, the unified paging module 202, the snapshot marker based reconstruction module 204, the checkpoint based reconstruction module 206, the garbage collection module 208, the translation table management module 210, the output buffer 230, and the memory 212 are hardware for performing the operations described below. In some embodiment, the input buffer 220, the controller 201, the unified paging module 202, the snapshot marker based reconstruction module 204, the checkpoint based reconstruction module 206, the garbage collection module 208, the translation table management module 210, the output buffer 230, and the memory 212 are sets of instructions executable by a processor or logic included in one or more customized processors, to provide its respective functionalities. In some embodiments, the input buffer 220, the controller 201, the unified paging module 202, the snapshot marker based reconstruction module 204, the checkpoint based reconstruction module 206, the garbage collection module 208, the translation table management module 210, the output buffer 230, and the memory 212 are stored in a memory and are accessible and executable by a processor to provide its respective functionalities. In further embodiments, the input buffer 220, the controller 201, the unified paging module 202, the snapshot marker based reconstruction module 204, the checkpoint based reconstruction module 206, the garbage collection module 208, the translation table management module 210, the output buffer 230, and the memory 212 are adapted for cooperation and communication with a processor and other components of the system 100. The particular naming and division of the units, modules, routines, features, attributes, methodologies and other aspects are not mandatory or significant, and the mechanisms that implement the present invention or its features may have different names, divisions, and/or formats.

The input buffer 220 is a buffer and software, code, or routines for receiving data and commands from one or more devices. In one embodiment, the input buffer 220 receives a data stream (data packets) from one or more devices and prepares them for storage in a non-volatile storage device (e.g. storage media or storage devices 110). In some embodiments, the input buffer 220 receives incoming data packets and temporally stores the data packets into the memory 212. In further embodiments, the input buffer 220 receives translation table entries and allocates them for storage in one or more storage devices 110. In other embodiments, the input buffer 220 receives a data stream from one or more devices and transmits the data stream to the unified paging module 202 and/or one or more other components of the storage logic 104.

The controller 201 includes software and/or logic for handling communications between the input buffer 220, the unified paging module 202, the snapshot marker based reconstruction module 204, the checkpoint based reconstruction module 206, the garbage collection module 208, the translation table management module 210, the output buffer 230 and the memory 212. In one embodiment, the controller 201 can be a set of instructions to store data stream in the memory 212. In another embodiment, the controller 201 can be instructions stored in the memory 212 of the storage logic 104 and can be accessible and executable by other components of the storage logic 104. The controller 201 in co-operation with the unified paging module 202, the snapshot marker based reconstruction module 204, the checkpoint based reconstruction module 206, the garbage collection module 208, the translation table management module 210 implement the methods of 10A to 17B below.

The unified paging module 202 is logic, software, code, or routines for implementing general unified paging method for translation tables. The unified paging module 202 may include software and/or logic for generating a dynamic look up structure for translation table entries. The unified paging module 202 is described in more detail below with reference to FIGS. 4 and 10A-10D.

The snapshot marker based reconstruction module 204 is logic, software, code, or routines for reconstructing the translation table state on boot up after planned and unplanned shutdown using snapshot markers. The snapshot marker based reconstruction module 204 may include software and/or logic for persisting translation table entries in the storage device 110 and reconstructing the translation table on boot up. The snapshot marker based reconstruction module 204 is described in more detail below with reference to FIGS. 5, 11A, 11B, 12A, and 12B.

The checkpoint based reconstruction module 206 is logic, software, code, or routines for capturing a snapshot of a translation table to persist it efficiently. The checkpoint based reconstruction module 206 may include software and/or logic for persisting translation table snapshots in the storage device 110 and reconstructing the translation table using the translation table snapshots on boot up. The checkpoint based reconstruction module 206 is described in more detail below with reference to FIGS. 6 and 13A-13B.

The garbage collection module 208 is logic, software, code, or routines for efficient garbage collection. The garbage collection module 208 may include software and/or logic for pinning looked up translation table entries to avoid multiple lookup fault during efficient garbage collection. The garbage collection module 208 is described in more detail below with reference to FIGS. 7 and 14A-14B.

The translation table management module 210 is logic, software, code, or routines for selecting which translation maps to page-out to flash for good paging efficiency. The translation table management module 210 may include software and/or logic for efficiently preserving the frequently used translation maps in memory to enable faster lookups and selecting which translation maps to page-out to flash for good paging efficiency. The translation table management module 210 is described in more detail below with reference to FIGS. 8, 16, 17A, and 17B.

The output buffer 230 is software, code, logic, or routines for queuing data for storage in the storage media or device 110. In one embodiment, the output buffer 230 receives data (e.g. translation table entries) and temporarily stores the data into a memory buffer (not shown). For instance, the output buffer 230 can temporarily store a data stream in a memory buffer while, waiting for one or more components to complete processing of other tasks, before transmitting the data stream to the one or more components to perform its acts and/or functionalities thereon. In some embodiments, the output buffer 230 receives a data stream from the unified paging module 202 and transmits the data stream to the storage devices 110 for storage.

The memory 212 may store and provide access to data for the other components of the storage logic 104. The memory 212 may be included in a single computing device or distributed among a plurality of computing devices. In some implementations, the memory 212 may store instructions and/or data that may be executed by a processor. The instructions and/or data may include code for performing the techniques described herein. For example, in one embodiment, the memory 212 may store the forward translation map 302, the reverse translation map 304, the timestamp log 306, the bitmap 308 and the metal-log journal 310, which are described in more detail below with reference to FIG. 3. The memory 212 is also capable of storing other instructions and data, including, for example, an operating system, hardware drivers, other software applications, databases, etc. The memory 212 may be coupled to a bus for communication with a processor (not shown) and the other components of the storage logic 104.

The memory 212 may include one or more non-transitory computer-usable (e.g., readable, writeable) devices, a dynamic random access memory (DRAM) device, a static random access memory (SRAM) device, mediums, which can be any tangible apparatus or device that can contain, store, communicate, or transport instructions, data, computer programs, software, code, routines, etc., for processing by or in connection with a processor. In some implementations, the memory 212 may include one or more of volatile memory and non-volatile memory. It should be understood that the memory 212 may be a single device or may include multiple types of devices and configurations. The memory 212 is described in more detail with reference to FIG. 3.

Figure 3:
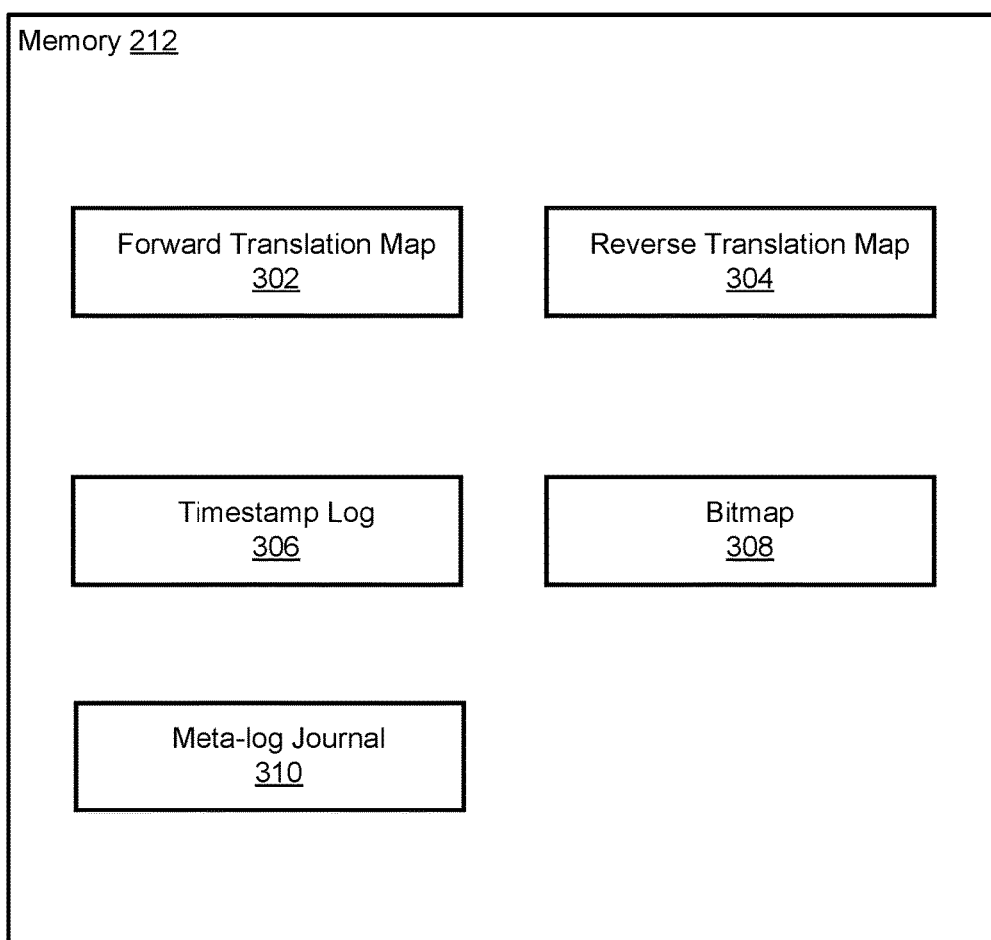
FIG. 3 is a block diagram illustrating an example of memory according to the techniques described herein.

FIG. 3 is a block diagram illustrating an example of memory 212. As depicted in FIG. 3, the example memory 212 may include the forward translation map 302, the reverse translation map 304, the timestamp log 306, the bitmap 308 and the metal-log journal 310.

The forward translation map 302 may be translation structure that maps a logical address associated with an entry to a physical address associated with the entry. In one embodiment, the forward translation table may provide translation from logical to physical (i.e. L→P) location.

The reverse translation map 304 may be translation structure that maps a physical address associated with an entry to a logical address associated with the entry. In one embodiment, the reverse translation table may provide translation from physical to logical block (i.e. P→L). The translation from physical to logical block may exhibit spatial locality during updates due to log write nature of using flash media. In some embodiments, updates to the reverse translation map 304 may be periodically persisted in the storage device 110.

The timestamp log 306 may include a snapshot marker and a checkpoint associated with a snapshot. The snapshot marker may be a free running counter denoting time. In some embodiments, the free running counter is incremented for each snapshot marker. The snapshot marker may be a timestamp of sufficient granularity associated with a map entry can allow determining older vs. newer entries. In some embodiments, the snapshot marker may be a counter associated with reverse translation table updates, wherein each time a reverse translation table is persisted, the counter is incremented. In some embodiments, the snapshot marker may be a counter associated with meta-log entries, wherein each time a new meta-log entry is created, the counter is incremented. It should be understood that the counter could be incrementing or decrementing so long as the counter value can be used to determine earlier snapshot markers from later snapshot markers.

The checkpoint may be included in a translation table snapshot. The checkpoint may be a free running counter denoting time. The checkpoint may be a timestamp of sufficient granularity associated with a map entry can allow determining older vs. newer entries. In some embodiments, the checkpoint may be a counter associated with reverse translation table updates, wherein each time a reverse translation table is persisted, the counter is incremented. In some embodiments, the checkpoint may be a counter associated with meta-log entries, wherein each time a new meta-log entry is created, the counter is incremented.

The bitmap 308 is a structure with bit per physical block. The bitmap 308 is maintained in the memory 212. Since, this is a bit per physical block, the size of this bitmap is dependent upon the physical size of the storage device 110 and is not dependent on the large logical space that a sparse translation structure supports.

The meta-log journal 310 includes a journal of recent logical map to physical map updates that have not yet been persisted in a reverse translation map. For example, the meta-log journal 310 may protect against any data loss scenarios because it persistently records map information that may not have been persisted in the reverse translation map. In one embodiment, each new translation table entry is logged in the special structure called meta-log before a write operation is considered complete. In some embodiments, the meta-log journal 310 is a limited size structure. For example, the meta-log journal 310 may be able to record a limited portion of data before it needs to flush out previous data entries into storage devices 110.

Figure 4:
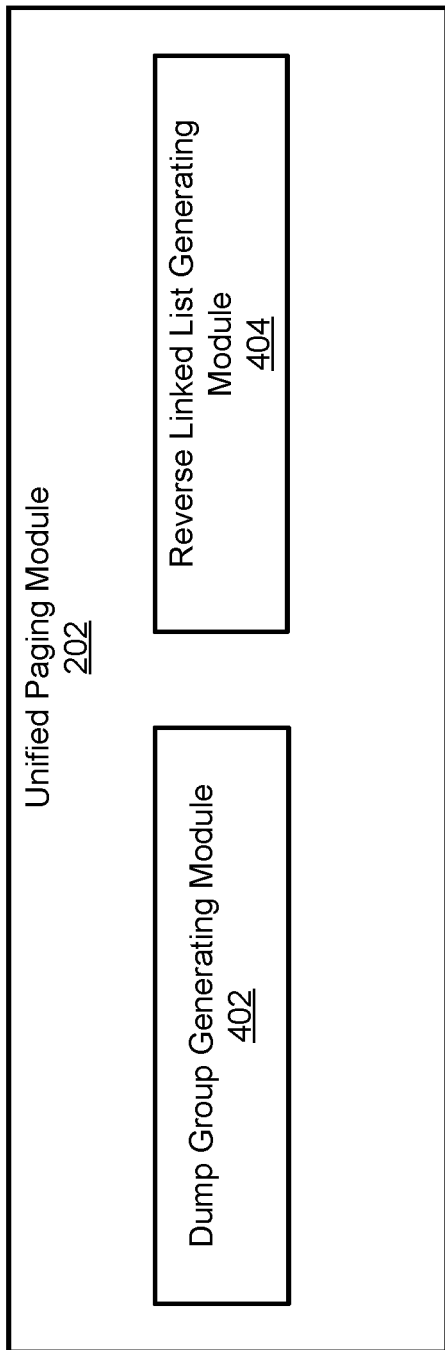
FIG. 4 is a block diagram illustrating an example unified paging module according to the techniques described herein.

FIG. 4 is a block diagram illustrating an example unified paging module configured to implement the techniques described herein. As depicted in FIG. 4, the example unified paging module 202 may include the dump group generating module 402 and the reverse linked list generating module 404.

In some embodiments, the components 402 and 404 are electronically communicatively coupled for cooperation and communication with each other, and are also coupled for communication with the other entities (e.g. storage device 110) of the system 100. In further embodiments, the dump group generating module 402 and the reverse linked list generating module 404 are sets of instructions executable by the storage logic 104. In other embodiments, the dump group generating module 402 and the reverse linked list generating module 404 are stored in the storage logic 104 and are accessible and executable by a processor (not shown) to provide their respective functionalities.

The dump group generating module 402 is logic or routines for generating dump groups associated with translation table entries. In one embodiment, the dump group generating module 402 is a set of instructions executable by a processor. In another embodiment, the dump group generating module 402 is stored in the storage logic 104 and is accessible and executable by the processor. In either embodiment, the dump group generating module 402 is adapted for cooperation and communication with the processor and other components of the system 100 including other components of the unified paging module 202.

In some embodiments, the dump group generating module 402 may generate dump groups associated with a dense translation table. In some embodiments, the dump group generating module 402 may receive a request to generate dump group from data received from the input buffer 220. In some embodiments, the dump group generating module 402 may generate dump groups associated with a sparse translation table. In some embodiments, the dump group generating module 402 may determine that a particular translation table entry is not present in the memory 212. The dump group generating module 402 may then look up the entry in the storage device 110. In some embodiments, the dump group generating module 402 may create a mapping that maps a given logical block number to fixed physical location on the storage device 110. For instance, in a dense translation table, the dump group generating module 402 creates the mapping between the logical block number and the fixed physical location on the storage device 110.

A sparse translation table has logical block numbers for a very wide range of addresses. As an example, an 80 bit logical block number address space may have each translation entry consuming 16 bytes. With fixed mapping, this would require, $2^{80}*16=2^{84}$ bytes of logical address space reserved for storing translation table entries. In some embodiments, the dump group generating module 402 may generate a dynamically updated lookup structure (map dump table) that maps the logical block number to a location on the storage device 110. For instance, in a sparse translation table, the dump group generating module 402 generates a unified paging structure (also referred to herein as a "map dump table") that maps the logical block number to a location on the storage device 110.

In some embodiments, the dump group generating module 402 identifies a dump unit associated with a translation table entry. For instance, the dump unit may be associated with a translation table entry from the forward translation map 302. Throughout this description the term "dump unit" is used interchangeably with the term "bucket". In some embodiments, the dump unit may be a smallest unit at which the map dump table maintains mapping from logical block to the storage device 110 location where translation table entries are dumped. In some embodiments, the dump group generating module 402 may map a logical block to a particular dump unit using a hash function. The hash function may be selected to well distribute logical blocks to various dump units as well as assign a few successive logical blocks to same dump unit to get a locality benefit for typical workloads. An example hash function may be Dump_unit (L)=L mod 512. This function maps successive logical block numbers to the same or the next dump unit.

In some embodiments, the dump group generating module 402 identifies a dump unit associated with the logical block and determines a dump group associated with the dump unit. In order to have efficient storage device lookup, the dump unit should be as small as possible so that minimal input/output is required to fetch a translation table entry for a given logical block. In some embodiments, the dump group generating module 402 may have a write path optimized for larger logical block sizes. For instance, it is desirable for dump translation table entries to have larger block sizes. In some embodiments, a dump group is a collection of fixed number of dump units that are grouped together for input/output efficiency during a write operation.

In some embodiments, the dump group generating module 402 may reserve a logical space on the storage device 110 for the dump group. In some embodiments, the logical space reserved for dumping translation table entries are divided into fixed size regions with each region assigned to a dump group. This division advantageously provides ease of management of translation table entries.

In some embodiments, the dump group generating module 402 generates a paged translation structure for translation table entries. In some embodiments, the dump group generating module 402 may receive a write request on a logical block that does not have its translation entry in the memory 212. In that case, the dump group generating module 402 may create a new entry in the memory 212 in response to receiving a write request. In some embodiments, the dump group generating module 402 may eliminate duplicate entries for a logical block to get a consolidated representation of translation table entries on the storage device 110.

The reverse linked list generating module 404 is logic or routines for generating a reverse linked list in the storage device 110. In one embodiment, the reverse linked list generating module 404 is a set of instructions executable by a processor (not shown). In another embodiment, the reverse linked list generating module 404 is stored in the storage logic 104 and is accessible and executable by the processor. In either embodiment, the reverse linked list generating module 404 is adapted for cooperation and communication with the processor and other components of the system 100 including other components of the unified paging module 202.

In some embodiments, reverse linked list generating module 404 may identify a most recent translation table entry associated with a dump unit. For instance, the reverse linked list generating module 404 may identify the most recent translation table entry associated with the dump unit on the storage device 110. In some embodiments, the dump unit may be dumped multiple times based on usage pattern. Each dump unit may have a disjoint set of translation table entries. The reverse linked list generating module 404 may generate a reverse linked list starting from the most recent translation table entry through the previous translation table entries associated with the dump unit. For instance, the reverse linked list generating module 404 may generate the reverse linked list to keep track of active locations on the storage device 110 where the dump unit is dumped.

In some embodiments, the reverse linked list generating module 404 may maintain a reverse chronological order of updates on a given logical block (with latest update being at the front of the linked list). This property is used to correctly satisfy a future lookup with the latest mapping for the requested logical block. For example, if a logical block L is updated as L→P", L→P' and L→P. The reverse linked list generating module 404 may track chronological order of updates to L, and the latest mapping for L can be unambiguously and quickly determined.

In some embodiments, the reverse linked list generating module 404 may traverse the reverse linked list and populate an in-memory translation table with the latest version of translation table entries from the storage device 110. The reverse linked list generating module 404 may trigger a dump of this group. In some embodiments, the reverse linked list generating module 404 eliminates duplicate entries for a given logical block. For example, a logical block L may have multiple mappings stored in media (e.g. L→P", L→P', etc.). The reverse linked list generating module 404 may eliminate duplicate entries for a given logical block in a periodic manner.

Figure 5:
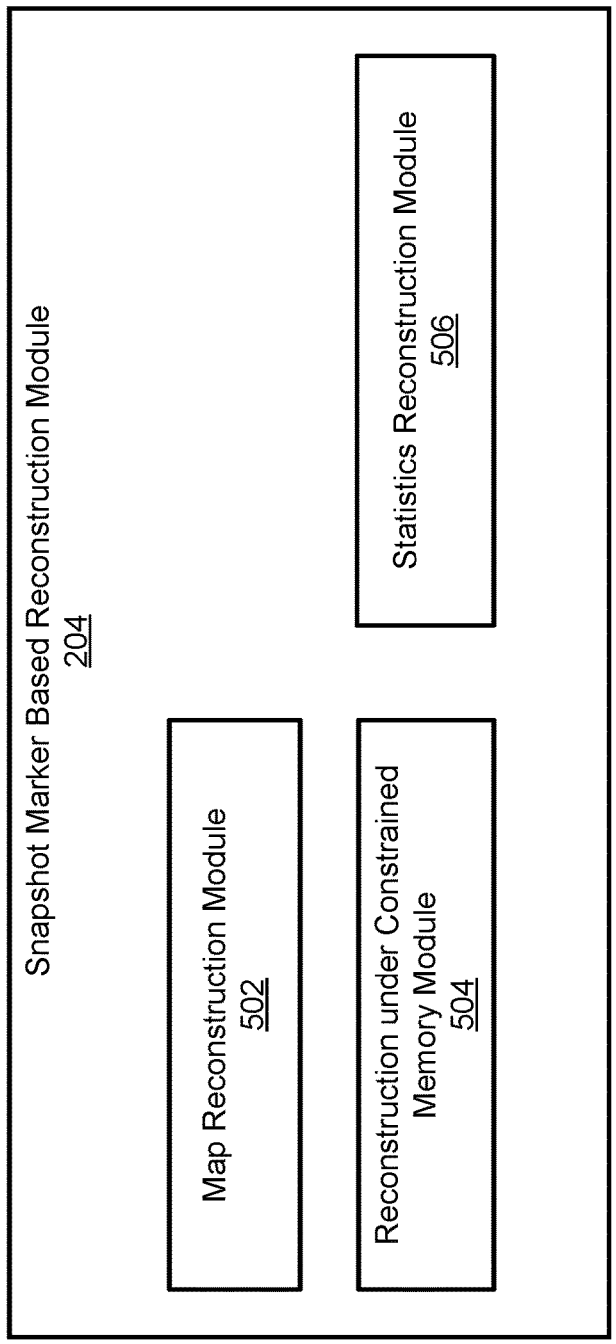
FIG. 5 is a block diagram illustrating an example snapshot marker based reconstruction module according to the techniques described herein.

FIG. 5 is a block diagram illustrating an example snapshot marker based reconstruction module 204 configured to implement the techniques described herein. A snapshot marker may be a marker associated with a dump unit on the storage device 110. The snapshot marker may be captured before the dump unit is written and the snapshot marker may be updated after dump unit write is complete. As depicted in FIG. 5, the example snapshot marker based reconstruction module 204 may include the map reconstruction module 502, the reconstruction under constrained memory module 504, and the statistics reconstruction module 506.

In some embodiments, the components 502, 504, and 506 are electronically communicatively coupled for cooperation and communication with each other, and are also coupled for communication with the other entities (e.g. storage device 110) of the system 100. The map reconstruction module 502 is logic or routines for reconstructing a translation table using a snapshot marker. The reconstruction under constrained memory module 504 is logic or routines for reconstruction of a translation table under constrained memory. The statistics reconstruction module 506 is logic or routines for reconstruction of statistics using translation table snapshot. In further embodiments, the map reconstruction module 502, the reconstruction under constrained memory module 504, and the statistics reconstruction module 506 are sets of instructions executable by the storage logic 104. In other embodiments, the map reconstruction module 502, the reconstruction under constrained memory module 504, and the statistics reconstruction module 506 are stored in the storage logic 104 and are accessible and executable by a processor (not shown) to provide their respective functionalities.

In some embodiments, the map reconstruction module 502 may implement a snapshot marker with the property that it is possible to examine the system and determine whether a translation table entry was created before or after the marker. In some embodiments, the map reconstruction module 502 may implement the snapshot marker can be as a free running counter denoting time. For example, the snapshot marker can be a timestamp of sufficient granularity associated with a translation table entry can allow determining older vs. newer entries.

In some embodiments, the map reconstruction module 502 may implement a snapshot marker as a counter associated with reverse translation table updates. For instance, each time a reverse translation table is persisted in the storage device 110, the counter is incremented. In other embodiments, the map reconstruction module 502 may implement a snapshot marker as a counter associated with meta-log entries. For example, each time a new translation table entry is created, and logged in the meta-log journal 310, the counter is incremented. In some embodiments, the map reconstruction module 502 may store the snapshot marker in the timestamp log 306 stored in the memory 212.

In some embodiments, the map reconstruction module 502 may annotate each reverse translation table entry, meta-log entry, and dump-unit (forward map chunks) with the snapshot marker value at the time of creation of that piece of information. This helps in fast translation table reconstruction after a planned/unplanned shutdown. In some embodiments, at reconstruction time, the map reconstruction module 502 may start with the saved value of a plurality of dump units associated with the forward translation map 302. In some embodiments, the timestamp log 306 compactly describes the saved value of the snapshot marker for each dump-unit. Therefore, in some embodiments, the map reconstruction module 502 may only have to look for translation table entries that were created after the snapshot marker had that value. The additional sources of translation table information are chunks of the reverse translation table and the meta-log entries. In some embodiments, the chunks of reverse translation table may be stored in the reverse translation map 304 and the meta-log entries may be stored in the meta-log journal 310. In some embodiments, the map reconstruction module 502 may retrieve snapshot marker value from the timestamp log 306. Based on the retrieved snapshot marker values, in some embodiments, the map reconstruction module 502 may determine whether a given reverse translation table entry or a given meta-log entry would contribute to reconstructing a forward map. This significantly accelerates translation table reconstruction as processing a large part of the reverse translation table (portion of the reverse translation table created before the snapshot marker had the retrieved value) can be avoided.

In some embodiments, the map reconstruction module 502 may rely on the meta-log journal 310. For instance, the minimum value of a saved snapshot marker across the dump units, as dump units are written or overwritten, is a non-decreasing value. In some embodiments, the meta-log journal 310 may retain information at least as far back as the minimum saved snapshot marker. In some embodiments, the map reconstruction module 502 may construct the entire forward translation table using the dump units associated with the saved forward translation map 302 and the meta-log journal 310.

The method for translation table reconstruction can be described using the following example. In the example, L1 is a first logical block and P1 is a physical location. A write happened on L1 that mapped to physical location P1. A new forward translation table entry L1→P1 and a reverse translation table entry P1→L1 was created. Reverse translation table entry P1→L1 was persisted with snapshot marker value S1. L1→P1 translation table entry persisted with snapshot marker value S1. A write happened on L2 that mapped to physical location P2. In this example, the forward map entry L2→P2 is created and is still in memory (not persisted yet). Reverse map entry P2→L2 is persisted with sequence number S2>S1. An unplanned shutdown of the system is followed by a system restart. When the system is starting up, the translation table updates before snapshot marker S1 are available on the storage device 110 and only translation table entries beyond snapshot marker S1 are retrieved from the reverse translation table (e.g. reverse translation map 304), i.e., only L2→P2 needs to be retrieved from the reverse translation table. This significantly speeds up the translation table reconstruction because a large fraction of the reverse translation table (those created before snapshot marker had the value S1) need not be read and processed.

In some embodiments, the reconstruction under constrained memory module 504 may receive a request to reconstruct a translation table under constrained memory. In some embodiments, the reconstruction under constrained memory module 504 may read the map dump (translation table entries) into the memory 212 from a well-known region. This provides the last persisted contents of a map dump table. In some embodiments, the reconstruction under constrained memory module 504 may compute a minimum value of the snapshot markers across the dump groups. In some embodiments, the reconstruction under constrained memory module 504 may retrieve the minimum value of the snapshot markers across the dump groups from the timestamp log 306. In some embodiments, the reconstruction under constrained memory module 504 may scan entries beyond the minimum snapshot marker from the reverse translation map 304 and/or the meta-log journal 310. During reconstruction, in some embodiments, the reconstruction under constrained memory module 504 may then selectively scan entries and add the entries to the translation table. In one embodiment, the selection criterion may be that the entry being added has a value of a first snapshot marker associated with it beyond a value of a second snapshot marker for the particular dump group. This results in populating only those entries that were in memory 212 at the time of unplanned shutdown, thus reducing memory consumption.

The method for starting up under constrained memory using two dump groups can be described using the following example. In the following example, two dump groups DG1 and DG2 are considered. The sequence describes only events relevant to translation table and it is implicit that these translation table updates are occurring after the data writes on the corresponding logical blocks. The convention used below is to refer LiGn for logical block i belonging to dump group n. Translation table entries L1G1→P1 and L1G2→P2 are added to the in-memory translation table. In the next step, P1→L1G1 and P2→L1G2 are persisted in the reverse map with a sequence number S1. Next, the translation table entries for DG1 are persisted with snapshot marker of S1 i.e. L1G1→P1 is now persisted and the corresponding memory is reclaimed. Translation table entries L2G1→P3 and L2G2→P4 are added to the in-memory translation table. Next, P3→L2G1 and P4→L2G2 are persisted in the reverse map with a sequence number S2. Translation table entries for DG2, i.e., L1G2→P2 and L2G2→P4 are now persisted and the corresponding memory is reclaimed. In the following step, an unplanned shutdown is followed by a system restart. The start-up flow first populates the dump group table thus recording S1 as the snapshot marker for DG1 and recording S2>S1 as the snapshot marker for DG2. The method for reconstruction identifies only L2G1 in DG1 with sequence number greater than S1 and thus populates only this entry in memory. For DG2, there is no reverse translation table entry with sequence greater than S2 and hence nothing extra is added to in-memory translation table. Thus, the only entry that was in memory 212 at the time of unplanned shutdown comes back into memory 212 after unplanned shutdown. The above steps result in populating only those entries that were in memory 212 at the time of unplanned shutdown, thus reducing memory consumption.

In one embodiment, the translation table may be a forward translation table and may be stored in the forward translation map 302 in the memory 212. In another embodiment, the translation table may be a reverse translation table and may be stored in the reverse translation map 304 in the memory 212. In some embodiments, the statistics reconstruction module 506 cannot bring the translation table into the memory 212 due to constrained size of memory 212.

In some embodiments, the statistics reconstruction module 506 may receive a request to reconstruct translation table statistics after a planned system shutdown. In response to receiving the request, the statistics reconstruction module 506 may restore the statistics that are persisted into a known region on the storage device 110. This provides quick start up ability for planned shutdowns.

At other times, the statistics reconstruction module 506 may receive a request to reconstruct translation table statistics after an unplanned system shutdown. In response to receiving the request, in some embodiments, the statistics reconstruction module 506 may regenerate the translation table statistics using the methods described below.

In some embodiments, a translation table includes multiple dump groups, of which only a subset can fit into the constrained memory at any point in time. In some embodiments, the statistics reconstruction module 506 may follow an iterative process, with each iteration including reading a subset of dump groups whose translation entries can fit into the memory. In some embodiments, the statistics reconstruction module 506 may reconstruct the translation table statistics by retrieving extra changes from the reverse translation map 304 and/or the meta-log journal 310. For instance, the extra changes are those changes to the translation table that happened beyond a snapshot marker for the subset of dump groups. In some embodiments, the statistics reconstruction module 506 may follow the iterative process to cover the dump groups. Since a given logical block uniquely maps to a single dump group, the iterative process will correctly account for the translation table entries and produce statistics those are consistent with the translation table.

Figure 6:
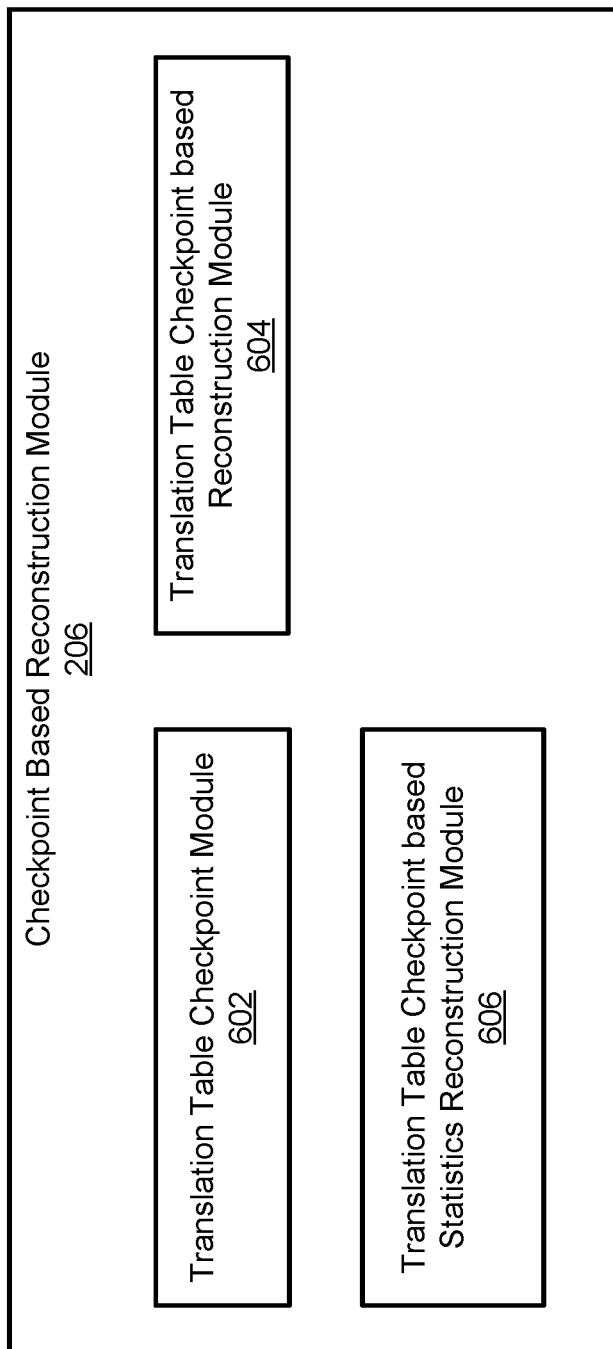
FIG. 6 is a block diagram illustrating an example checkpoint based reconstruction module according to the techniques described herein.

FIG. 6 is a block diagram illustrating an example checkpoint based reconstruction module 206 configured to implement the techniques described herein. A snapshot of the translation table is periodically captured. In some embodiments, the snapshot includes a checkpoint value at beginning of the snapshot, contents of a map dump table and the non-persisted entries written out in a log format. As depicted in FIG. 6, the example checkpoint based reconstruction module 206 may include the translation table checkpoint module 602, the translation table checkpoint based reconstruction module 604, and the translation table checkpoint based statistics reconstruction module 606.

In some embodiments, the components 602, 604, and 606 are electronically communicatively coupled for cooperation and communication with each other, and are also coupled for communication with the other entities (e.g. storage device 110) of the system 100. The translation table checkpoint module 602 is logic or routines for generating a translation table checkpoint. The translation table checkpoint based reconstruction module 604 is logic or routines for reconstruction using translation table checkpoint. The translation table checkpoint based statistics reconstruction module 606 is logic or routines for reconstruction of statistics using translation table checkpoint. In further embodiments, the translation table checkpoint module 602, the translation table checkpoint based reconstruction module 604, and the translation table checkpoint based statistics reconstruction module 606 are sets of instructions executable by the storage logic 104. In other embodiments, the translation table checkpoint module 602, the translation table checkpoint based reconstruction module 604, and the translation table checkpoint based statistics reconstruction module 606 are stored in the storage logic 104 and are accessible and executable by a processor (not shown) to provide their respective functionalities.

In some embodiments, the translation table checkpoint module 602 may implement a checkpoint associated with a translation table snapshot with the property that it is possible to examine the system and determine whether a translation table snapshot was created before or after the checkpoint. For instance, the checkpoint may include a timestamp indicating a creation time of the translation table snapshot. In some embodiments, the translation table checkpoint module 602 may include the checkpoint in the translation table snapshot and store the checkpoint in the timestamp log 306 stored in the memory 212. In some embodiments, the translation table checkpoint module 602 may implement the checkpoint can be as a free running counter denoting time. For example, the checkpoint (included in the translation table snapshot) can be a timestamp of sufficient granularity associated with a translation table entry can allow determining older vs. newer entries.

In some embodiments, the translation table checkpoint module 602 may implement a checkpoint as a counter associated with reverse translation table updates. For instance, each time a reverse translation table is persisted in the storage device 110, the counter is incremented. In other embodiments, the translation table checkpoint module 602 may implement a checkpoint as a counter associated with meta-log entries. For example, each time a new translation table entry is created and logged in the meta-log journal 310, the counter is incremented.

In some embodiments, on a system with paged forward translation table, a subset of the forward translation table is resident in the storage device 110 while the other subset is resident in the memory 212 in forward translation map 302. The system 100 has continuous flow of translation table entries back and forth between the storage device 110 and the memory 212. In such embodiments, the translation table checkpoint module 602 intends to capture the memory resident translation table entries (e.g. translation table snapshot) that have not yet been persisted to the storage device 110 using a snapshot. This is advantageous as the translation table checkpoint module 602 will be able to recreate the memory resident state on boot-up post a planned or unplanned shutdown.

A snapshot of the translation table includes the translation table and all other translation table entries that are non-persisted in the storage media (storage device 110) and need to be persisted before they can be purged from memory 212. In some embodiments, the translation table checkpoint module 602 periodically takes a snapshot of the translation table and persists it in the storage device 110. In some embodiments, the translation table checkpoint module 602 may persist a checkpoint associated with the snapshot in the timestamp log 306. In one embodiment, updates to the translation table may happen in a time window between two consecutive snapshots. The translation table checkpoint module 602 may obtain these updates, post the last snapshot, from the meta-log journal 310 and/or the reverse translation map 304 stored in the memory 212. In some embodiments, the translation table checkpoint module 602 identifies the updates from the reverse translation map 304 and the meta-log journal 310 based on the checkpoint.

In some embodiments, the translation table checkpoint module 602 determines the current value of the checkpoint whenever a snapshot of the translation table is about to be taken. The translation table checkpoint module 602 may then determine entries in the translation table that are non-persisted in the storage device 110. The translation table checkpoint module 602 may write the entries to the storage device 110. In some embodiments, the translation table checkpoint module 602 may update the checkpoint in a map dump table associated with the translation table and the modified map dump table is also persisted in the storage device 110. In some embodiments, the translation table checkpoint module 602 may update the checkpoint in the timestamp log 306. With this flow, it is ensured that all the translation table entries that were modified before the checkpoint are persisted in the storage device 110 and can be retrieved from the storage device 110 on a boot-up. In some embodiments, the translation table entries that were modified after the snapshot can be identified (in reverse map and meta-log) with the help of the checkpoint, and selectively brought into memory during boot.

In this system at any point of time, the entries that are non-persisted in the storage device 110, may be spread across various dump units. Hence persisting the dump units during a boot up is inefficient. For efficient input/output, the translation table checkpoint module 602 may write translation table entries that are not backed up in the storage device 110 consecutively in a log-format, without taking into account, which dump unit they belong to. This allows the translation table entries to be written in a consolidated form because writing translation table entries for each dump-group separately (as 4K-sized blocks) may result in wasted space as there may not be enough non-persisted maps (translation table entries) per dump-group.

In some embodiments, the translation table checkpoint based reconstruction module 604 may receive a request to update a translation table stored in the memory 212. In response to receiving the request, the translation table checkpoint based reconstruction module 604 may annotate each reverse translation map 304 entry, meta-log journal 310 entry, and dump unit (forward translation table chunks) with the value associated with a checkpoint.

In some embodiments, the translation table checkpoint based reconstruction module 604 may locate the last snapshot on the storage device 110. For instance, this is resident at a well-known logical location. In some embodiments, the translation table checkpoint based reconstruction module 604 may read a map dump table and restore it into memory. This makes the location of all persisted translation table entries available. In some embodiments, to reconstruct the in-memory state at the time of planned/unplanned shutdown, the translation table checkpoint based reconstruction module 604 may start with translation table entries that are non-persisted in the storage device 110 from the snapshot, and may add all the entries to the in-memory translation table. For instance, the in-memory translation table may be stored in the forward translation map 302 and the reverse translation map 304 in the memory.

In some embodiments, the translation table checkpoint based reconstruction module 604 may identify the checkpoint from the map dump table. In some embodiments, the translation table checkpoint based reconstruction module 604 may identify the checkpoint from the timestamp log 306. For translation table entries updated beyond the snapshot associated with the checkpoint, the translation table checkpoint based reconstruction module 604 may scan for entries beyond the snapshot marker from reverse translation map 304 and/or meta-log journal 310. In one embodiment, the translation table checkpoint based reconstruction module 604 may selectively add the scanned entries to the translation table only if the entry being added has a value beyond the checkpoint. The translation table checkpoint based reconstruction module 604 thus advantageously guarantees that only those entries that were in memory at the time of unplanned/planned shutdown gets populated in memory after boot up too thus guaranteeing constrained memory consumption.

The translation table checkpoint based statistics reconstruction module 606 may track translation table statistics at run time through in-memory counters as and when translation table entries are updated. For instance, the translation table checkpoint based statistics reconstruction module 606 may keep track of translation table statistics using a plurality of counters in the memory 212. In some embodiments, reconstructing translation table statistics on boot-up after an unplanned shutdown, may require translation table checkpoint based statistics reconstruction module 606 to complete a full scan of translation table entries persisted in the storage device 110.

In some embodiments, the translation table checkpoint based statistics reconstruction module 606 may receive a request to reconstruct translation table statistics after a planned system shutdown. In response to receiving the request, the translation table checkpoint based statistics reconstruction module 606 may restore all statistics that are persisted into a known region on the storage device 110. This provides quick start up ability for planned shutdowns.

In some embodiments, the translation table checkpoint based statistics reconstruction module 606 may receive a request to reconstruct translation table statistics after an unplanned system shutdown. In response to receiving the request, in some embodiments, the translation table checkpoint based statistics reconstruction module 606 may regenerate the translation table statistics. The full translation table includes multiple dump groups, of which only a subset can fit into the constrained memory at any point of time. In some embodiments, the translation table checkpoint based statistics reconstruction module 606 may iteratively read some dump groups that can fit into the memory 212 and reconstruct the statistics. In some embodiments, the translation table checkpoint based statistics reconstruction module 606 may apply extra changes beyond the checkpoint for the dump groups under process from the reverse translation map 304 and/or the meta-log journal 310. Since a given logical block uniquely maps to a single dump group, the translation table checkpoint based statistics reconstruction module 606 correctly accounts for all translation table entries and produce statistics those are consistent with the translation table.

Figure 7:
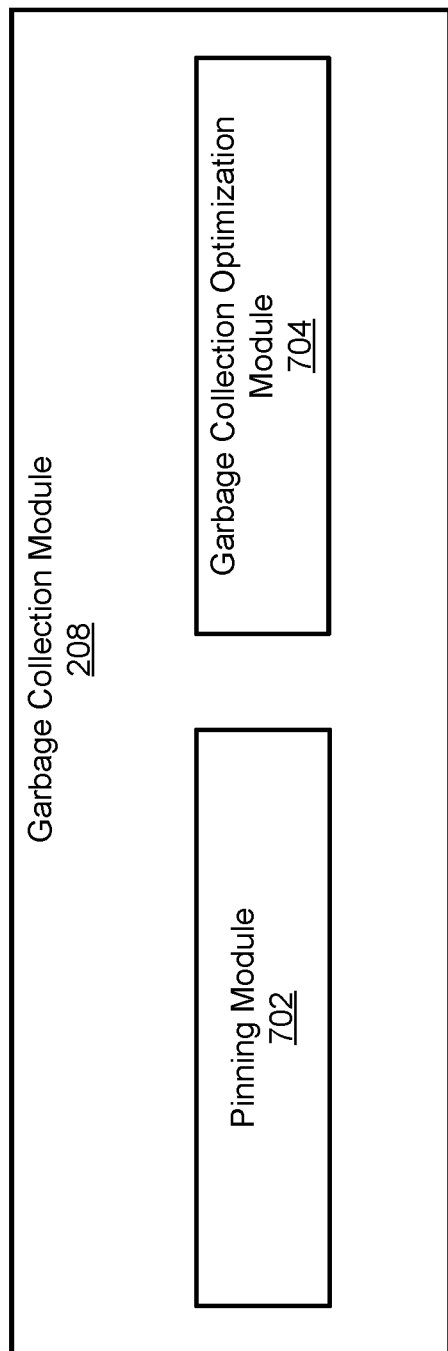
FIG. 7 is a block diagram illustrating an example garbage collection module according to the techniques described herein.

FIG. 7 is a block diagram illustrating an example garbage collection module 208 configured to implement the techniques described herein. As depicted in FIG. 7, the example garbage collection module 208 may include the pinning module 702 and the garbage collection optimization module 704.

In some embodiments, the components 702 and 704 are electronically communicatively coupled for cooperation and communication with each other, and are also coupled for communication with the other entities (e.g. storage device 110) of the system 100. The pinning module 702 is logic or routines for pinning translation table entries in the memory 212. The garbage collection optimization module 704 is logic or routines for optimizing garbage collection in the memory 212. In further embodiments, the pinning module 702 and the garbage collection optimization module 704 are sets of instructions executable by the storage logic 104. In other embodiments, the pinning module 702 and the garbage collection optimization module 704 are stored in the storage logic 104 and are accessible and executable by a processor (not shown) to provide their respective functionalities.

In some embodiments, the pinning module 702 may pin translation table entries in the memory 212 such that the translation table entries are not paged out unless explicitly unpinned. For instance, the pinning module 702 may pin translation table entries by setting, marking or flagging the translation table entry so that the translation table entry may remain in memory 212 and is not moved to storage media 110. Unpinning refers to unmarking or unsetting the flag. In some embodiments, the pinning module 702 can be implemented using a reference count on each translation table entry and an entry with non-zero reference count is never paged out. For instance, in response to a request to pin a translation table entry in the memory 212, the pinning module 702 may associate the translation table entry with a non-zero reference number. In some embodiments, a pinned translation table entry can never be purged out of the memory 212, until the pinned translation table entry reaches an expiration time-out.

In some embodiments, typical input/output flows involve multiple lookups of a translation table entry associated with a given logical block. It is advantageous for the pinning module 702 to be able to serve the lookup without blocking, e.g., without involving device input/output. In some embodiments, the pinning module 702 allows lookup and pin the looked up translation table entry as a preparatory step. In some embodiments, the pinning module 702 may also aggregate lookup requests using a queue such that lookups can be done in an aggregated fashion thus optimizing on device input/output.

In some embodiments, the pinning module 702 may also perform pre-fetch detection. For instance, in response to a pre-fetch detection request, the pinning module 702 may bring in translation table entries ahead of time and pin them in the memory 212 for guaranteed fault free lookups for pre-fetched entries. The pinned entry can be associated with an expiration time after which it is unconditionally unpinned. In some embodiments, the pinning module 702 addresses cases where pre-fetch made wrong prediction of logical blocks that are going to be accessed.

In some embodiments, garbage collection optimization module 704 identifies a physical area on the storage device 110 to perform a garbage collection operation. The garbage collection optimization module 704 may then query for all the logical blocks that are included in this physical area of the storage device 110. For instance, the query involves a reverse translation map structure that maps physical location to logical block numbers. The query further involves a validation step with a forward translation map structure.

In some embodiments, the reverse translation map structures are not strictly up-to-date and hence the information from the reverse translation map structure is validated with the forward translation map structure to decide on the physical locations that are still valid and needs the data to be moved. In some embodiments, the garbage collection optimization module 704 may preserve attributes associated with the logical block by querying the forward map.

Sometimes with paged translation systems, the garbage collection generally happens on logical blocks that have been written sometime in the past and hence do not have their translation table entries in memory. For instance, a translation table entry may be paged out of the memory 212 if the translation table entry older than a threshold time. In some embodiments, the garbage collection optimization module 704 may start garbage collection from a physical address space. For instance, the garbage collection operation does not have any locality with respect to the logical blocks.

In some embodiments, the garbage collection optimization module 704 maintains a bitmap with bit per physical block in the memory 212. Since, this is bit per physical block, the size of this bitmap is limited by the physical size of the storage device 110. In some embodiments, the garbage collection optimization module 704 may determine that a physical block is assigned to a logical block and turn on the corresponding bit. In some embodiments, the garbage collection optimization module 704 may determine that a logical block is overwritten (hence invalidating the previously mapped physical block) and may turn off the corresponding bit. As an example, if Logical L1 maps to P1, then bit for P1 is turned ON and when L1 is overwritten to map to new physical block P2, the bit for P1 is turned OFF and bit for P2 is turned ON.

In some embodiments, the garbage collection optimization module 704 may select a physical chunk to relocate and using the bitmap. For instance, the garbage collection optimization module 704 may filter out only those physical blocks that have the bit turned ON. In some embodiments, these are the only blocks that needed to be moved since all other blocks are implicitly holding data that has been overwritten with newer data. Also, for filtered physical blocks, all attribute information for the logical block may be present in the reverse translation map 304.

Figure 8:
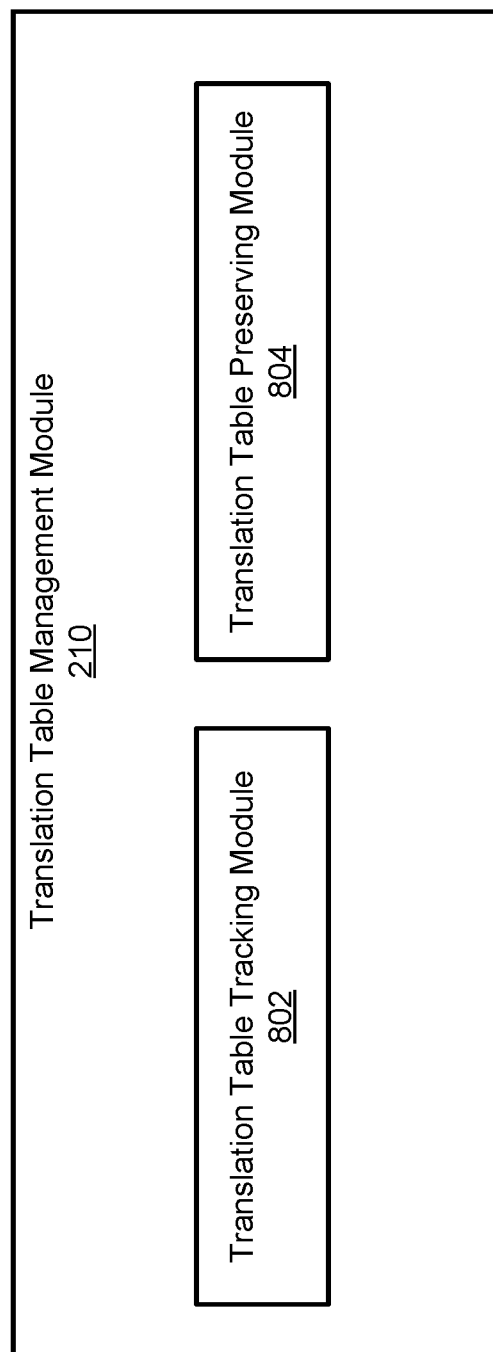
FIG. 8 is a block diagram illustrating an example translation table management module according to the techniques described herein.

FIG. 8 is a block diagram illustrating an example translation table management module 210 configured to implement the techniques described herein. As depicted in FIG. 8, the example translation table management module 210 may include the translation table tracking module 802 and the translation table preserving module 804.

In some embodiments, the components 802 and 804 are electronically communicatively coupled for cooperation and communication with each other, and are also coupled for communication with the other entities (e.g. storage device 110) of the system 100. The translation table tracking module 802 is logic or routines for tracking translation table entries in the memory 212. The translation table preserving module 804 is logic or routines for preserving translation table entries in the memory 212. In further embodiments, the translation table tracking module 802 and the translation table preserving module 804 are sets of instructions executable by the storage logic 104. In other embodiments, the translation table tracking module 802 and the translation table preserving module 804 are stored in the storage logic 104 and are accessible and executable by a processor (not shown) to provide their respective functionalities.

In some embodiments, the translation table tracking module 802 maintains statistics on a per-dump-group basis. The translation table tracking module 802 counts how many translation table entries are present in each dump group and determines how many of these translation table entries are currently non-persisted in the storage device 110. In some embodiments, the translation table tracking module 802 also determines a number of the translation table entries in the each dump group that are not allowed to be purged from memory (memory 212). In some embodiments, the dump group generating module 402 generates a dump group using a number of translation table entries.

In some embodiments, for each dump-group, the translation table tracking module 802 maintains a linked list pointer that allows the dump group to be attached to a linked-list. For example, a multi-level linked lists data structure is used to categorize the dump groups. In some embodiments, each linked list holds a threshold number of dump groups that satisfy a certain pre-defined criteria for that list. The translation table tracking module 802 may evaluate each dump group and add to one of the linked lists. In some embodiments, the criteria for the linked lists is chosen to be the number of translation table entries present in the dump group that are not persisted in the storage device 110 and a ratio between the total number of translation table entries in a dump group and the number of translation table entries present in the dump group that are non-persisted in the storage device 110.

As the number of the number of translation table entries present in the dump group that are non-persisted in the storage device 110 changes in a dump group, the translation table tracking module 802 may re-evaluate if the dump group needs to be migrated to some other linked list. In some embodiments, each of the dump groups is loosely sorted in its respective linked list. It is advantageous because the system does not need to scan the entire system if it needs to page-out some dump group. Instead, the system chooses one of the dump groups from the linked list having the highest ratio. This not only ensures that the dumping operation is efficient, but the selection logic also has constant time-complexity.

In some embodiments, depending on a translation table implementation method and the data structures used, different unrelated translation table entries may be grouped in the same chunk of the translation table. For example, a hash function may be used to determine which dump unit a given translation table entry should belong to.

A dump unit includes of multiple translation table entries. The translation table preserving module 804 generates fixed sized nodes attached to each dump unit with each fixed size node holding fixed number of translation table entries. In some embodiments, the translation table preserving module 804 may preserve translation table entries in the memory 212 by dividing the dump unit in two groups of nodes. One group holding the nodes including the frequently accessed translation table entries (also referred to as hot group), and the other group including nodes holding the remaining translation table entries (also referred to as cold group). In some embodiments, the translation table preserving module 804 may determine the number of nodes in the hot group based on the ratio of translation table entries in memory to the translation table entries in storage media. For instance, the translation table preserving module 804 determines a first number of nodes including frequently accessed translation table entries and a second number of groups including rarely accessed translation table entries. In some embodiments, in response to a memory reclaim request, the translation table preserving module 804 may select the second number of groups to purge out of the memory 212.

In some embodiments, the translation table preserving module 804 may assign a bit to each translation table entry in the hot node (recent access bit). The recent access bit is turned ON whenever the translation table entry associated with the recent access bit is accessed. In some embodiments, the translation table preserving module 804 analyzes the translation table entries in the hot group in a round-robin fashion. In response to determining that a bit is set, the translation table preserving module 804 may clear the bit and skip it. In some embodiments, the translation table preserving module 804 may repeat this for each eviction cycle. In some embodiments, when the translation table preserving module 804 finds a translation table entry that has the bit cleared, the translation table preserving module 804 may select that translation table entry to be evicted.

This scanning for the translation table entries is round-robin to provide fairness is ensured as each translation table entry is given at least one chance (clearing the bit from 1 to 0) to survive before eviction. The advantage is that as long as a translation table entry continues to get accessed, it will remain in the hot group without getting evicted ever. In some embodiments, the translation table preserving module 804 evicts a translation table entry from a hot group and may move it into the rarely accessed (cold) group. In response to a memory-reclaim request, the translation table preserving module 804 may evict translation tables from the nodes in the cold group. These translation table entries are then removed from the memory 212.

In some embodiments, when a translation table entry is looked up by the translation table preserving module 804, the translation table entry may be present in the storage device 110, the translation table entry may be present in the cold node (node including rarely accessed translation table entries) or the translation table entry may already be present in the hot node (node including frequently accessed translation table entries).

For instance, if the translation table entry is present in the storage device 110, the translation table entry is read from the storage device 110 and brought into the hot node evicting one of the least recently accessed translation table entries. If the translation table entry is present in the cold node, the translation table preserving module 804 may swap the translation table entry with the least recently accessed entry in hot node. If the translation table entry is already present in the hot node, the translation table preserving module 804 may set the recent access bit for the translation table entry.

In some embodiments, translation table entries may be created in the system 100 as an after effect of any write operation on the system. For example, this write operation may include user writes as well as writes coming in from internal management operations like garbage collection. Typically, the garbage collection happens on rarely accessed translation table entries. In some embodiments, the translation table preserving module 804 may utilize the garbage collection as a hint to effectively segregate all garbage collection translation table entries as rarely accessed translation table entries.

In some embodiments, the translation table preserving module 804 may utilize hints from applications exhibiting access patterns to determine the frequently accessed translation table entries. For example, applications exhibiting access patterns may involve access types where most recently accessed translation table entry is not accessed for long duration (e.g. a sequential write to a file). This would result in wrong translation table entries being tracked as 'frequently accessed' (hot). In such embodiments, the application may provide a hint to the translation table preserving module 804 identifying the translation table entry was accessed once. In some embodiments, the translation table preserving module 804 may utilize the hint to avoid classifying such translation table entries as frequently accessed.

Figure 9:
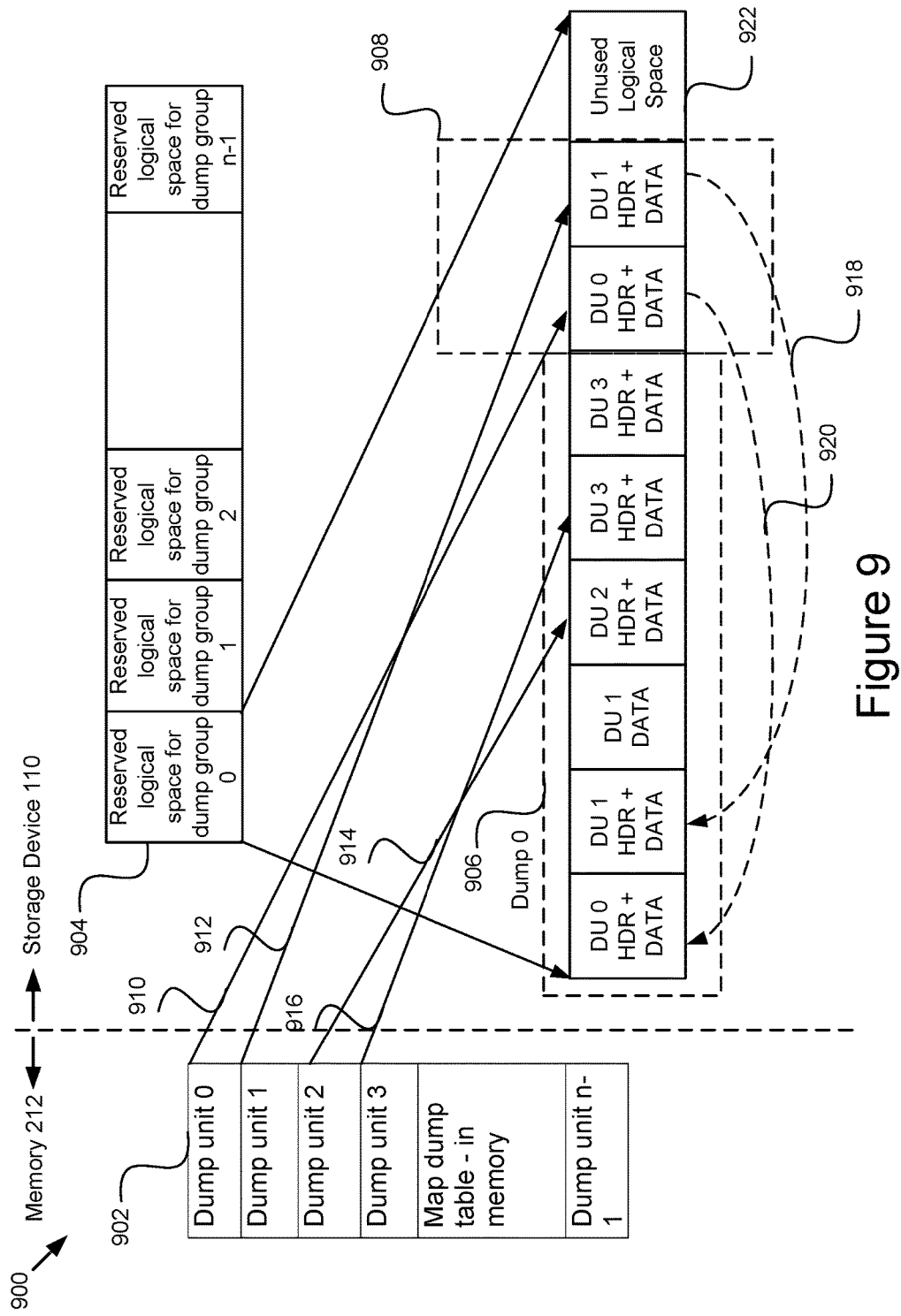
FIG. 9 is an example graphical representation illustrating one embodiment of a unified paging structure for translation tables, according to the techniques described herein.

FIG. 9 is an example graphical representation illustrating one embodiment of a unified paging structure for translation tables. In the example of FIG. 9, the dump group 902 includes dump unit 0, dump 1, dump unit 2, dump unit 3 . . . dump unit n−1. The dump group 902 represents an array of dump units and is resident on the memory 212 as illustrated in the FIG. 9. In the example of FIG. 9, a single array of dump units is shown, but there could be several arrays of dump units. The logical space in the storage device 110 is allocated to each dump group. In some embodiments, the logical space may be divided into buckets (dump units) based on a hash function on a logical block number. In some embodiments, a fixed number (4-8) of dump units are grouped into dump groups. Each dump group is assigned a fixed range of logical space. The logical space allocation array 904 includes the reserved logical space allocated to each dump group. In the example of FIG. 9, the reserved logical space for dump group 0 is the array 922.

The array 922 has dump 0 906 and dump 1 908. Dump 0 906 refers to the previous entries associated with the dump units resident in dump group 902 in the memory 212. Dump 1 906 refers to the most recent entries associated with the dump units resident in dump group 902 in the memory 212. In the example of FIG. 9, dump 0 906 includes header and data for dump unit 0, header and data for dump unit 1, data for dump unit 1, header and data for dump unit 2, header and data for dump unit 3.

In the example of FIG. 9, dump 1 908 includes header and data for dump unit 0 and header and data for dump unit 1. The elements of dump 1 908 represents the active entries associated with the dump unit 0 and the dump unit 1 in the dump group 902 in the memory 212.

As illustrated in FIG. 9, the dump unit 0 in the dump group 902 maintains a connection 910 with the header and data for dump unit 0 in dump 1 908. Similarly, the dump unit 1 in the dump group 902 maintains a connection 912 with the header and data for dump unit 1 in dump 1 908, the dump unit 2 in the dump group 902 maintains a connection 914 with the header and data for dump unit 2 in dump 0 906, and the dump unit 3 in the dump group 902 maintains a connection 916 with the header and data for dump unit 3 in dump 0 906. A reverse linked list (not shown but represented by 918 and 920) connects all previous entries associated with the dump unit in the storage device 110. The dumps for a dump unit can be iterated through the reverse linked list stored on the storage device 110. In the example of FIG. 9, the most recent entry associated to dump unit 0 stored in dump 1 908 is linked to a previous entry associated to dump unit 0 stored in dump 0 906 via link 920. Similarly, the most recent entry associated to dump unit 1 stored in dump 1 908 is linked to a previous entry associated to dump unit 1 stored in dump 0 906 via link 918.

Figure 10A:
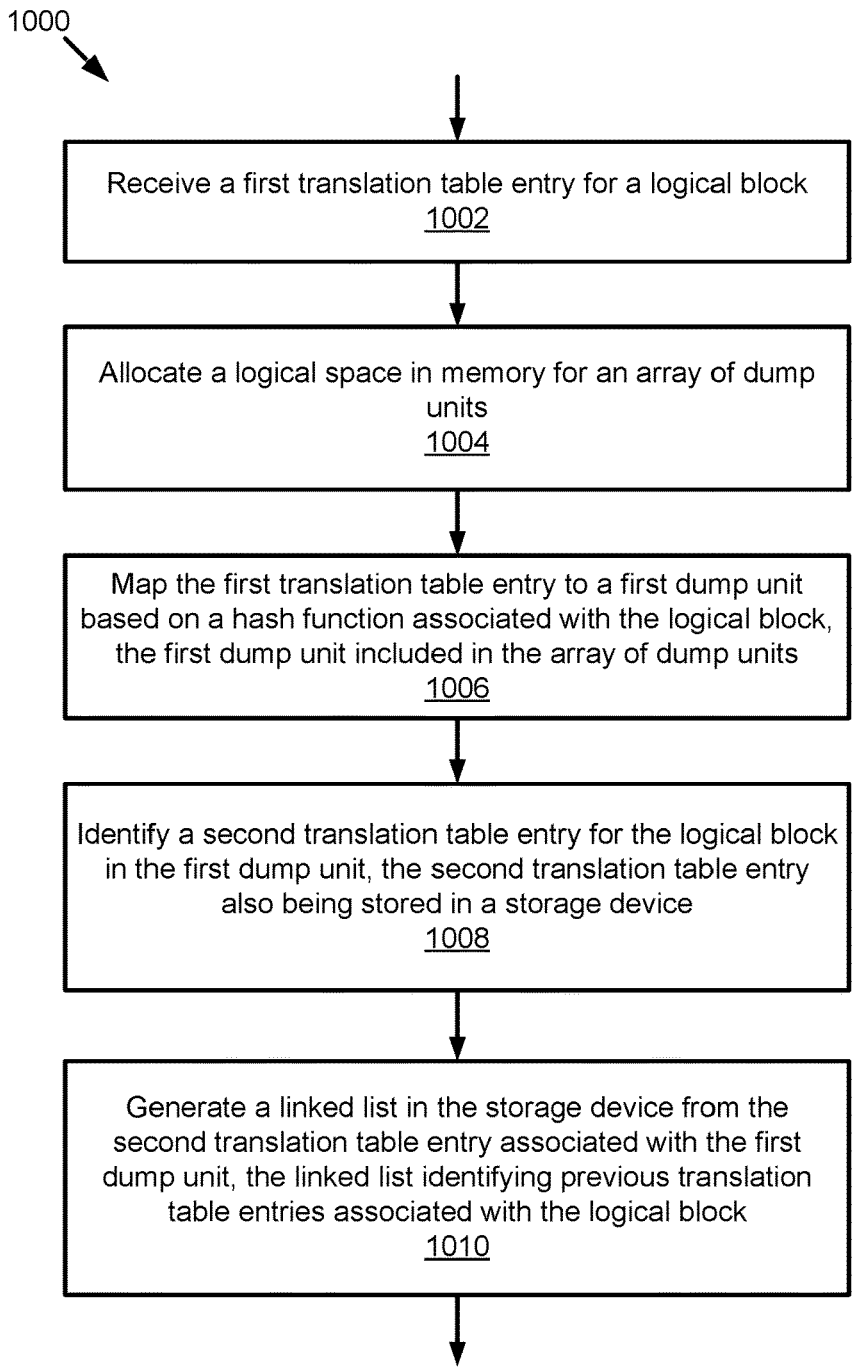
FIG. 10A is a flow chart of an example method for implementation of a general unified paging of translation tables, according to the techniques described herein.

FIG. 10A is a flow chart of an example method 1000 for implementation of general unified paging of translation tables. The method 1000 may begin by receiving 1002 a first translation table entry for a logical block. In some embodiments, the input buffer 220 receives the first translation table entry as portion of the data stream.

Next, the method 1000 may continue by allocating 1004 a logical space in memory for an array of dump units. In some embodiments, the dump group generating module 402 may receive the first translation table entry from the input buffer 220 and perform its functions.

In one embodiment, a dump unit is a smallest unit at which the unified paging module 202 maintains mapping from logical block to storage media location where translation entries are dumped. In one embodiment, a dump unit can also be referred to as a bucket. In some embodiments, in order to have efficient media lookup, the dump unit may be as small as possible so that minimal input/output would need to be done to fetch the translation entry for a given logical block, during a read operation.

A dump group may also be referred to as a bucket group. In one embodiment, the dump group is a collection of fixed number of dump units that when dumped are dumped together for write input/output efficiency. Each dump group is assigned a fixed range of logical space in memory. In some embodiments, the logical space reserved for translation table dumps are divided into fixed size regions with each region assigned to a dump group. This division provides ease of management, as discussed elsewhere herein.

Next, the method 1000 may advance by mapping 1006 the first translation table entry to a first dump unit based on a hash function associated with the logical block, the first dump unit included in the array of dump units. In some embodiments, the dump group generating module 402 may map the first translation table entry using a hash function of a logical block number of the logical block of the first translation table. A logical block is mapped to a particular dump unit using the hash function. The hash function is selected to well distribute logical blocks to various dump units as well as assign a few successive logical blocks to same dump unit to get locality benefit for typical workloads. For example, a hash function Dump_unit(L)=L mod 512, maps successive logical block number to the same or the next dump unit.

The method 1000 may then continue by identifying 1008 a second translation table entry for the logical block in the first dump unit, wherein the second translation table entry also being stored in a storage device 110. The second translation table entry associated with the dump unit can be stored in the storage device 110. In one embodiment, the second translation table entry may also be referred to as the most recent translation table entry associated with the dump unit. In some embodiments, the most recent translation table entry refers to the most recent location in the storage media 110, storing a translation table entry data (e.g. dump) associated with the dump unit. In some embodiments, the above discussed can be applied in relation to sparse and dense translation table entries, and as will be further discussed below. In some embodiments, the operations in step 1008 can be performed by the dump group generating module 402 in cooperation with the input buffer 220 and/or one or more other entities of the system 100, as discussed elsewhere herein.

The method 1000 may then continue by generating 1010 a linked list in the storage device 110 from the second translation table entry associated with the first dump unit, the linked list identifying previous translation table entries associated with the logical block. In some embodiments, the linked list may be a reverse linked list. In some embodiments, a given dump unit may be dumped multiple times based on usage pattern with each dump unit having a disjoint set of translation table entries. To keep track of all active locations where a dump unit is dumped, the reverse linked list may start from the most recent location associated with the dump unit. In some embodiments, the operations in step 1010 can be performed by the reverse linked list generating module 404 in cooperation with the dump group generating module 402 and/or one or more other entities of the system 100, as discussed elsewhere herein.

Figure 10B:
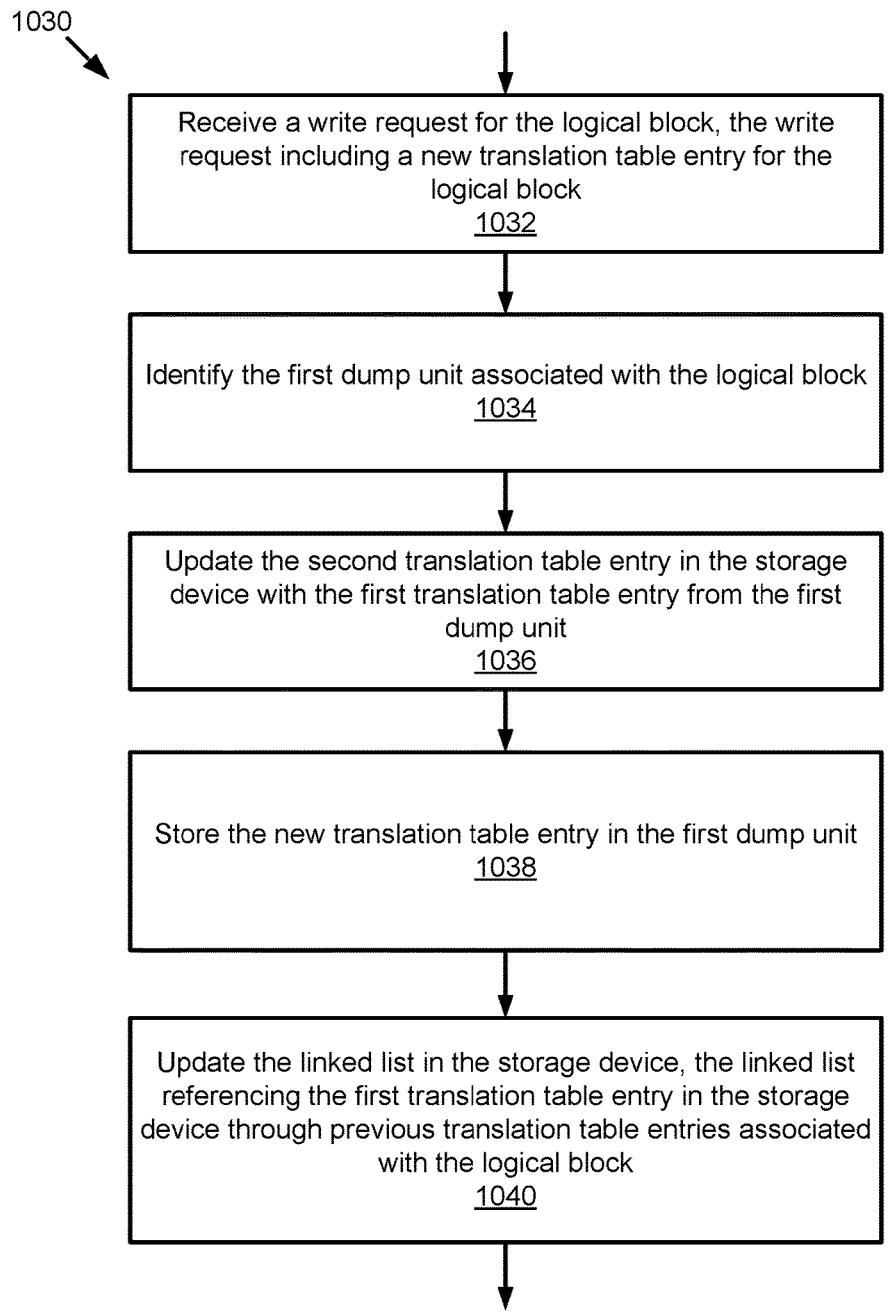
FIG. 10B is a flow chart of an example method for implementing a write request on a unified paged structure of translation tables, according to the techniques described herein.

FIG. 10B is a flow chart of an example method 1030 for implementing a write request on a unified paged structure of translation tables. The method 1030 may begin by receiving 1032 a write request for a logical block, wherein the write request includes a new translation table entry for the logical block.

Next, the method 1030 continues by identifying 1034 the first dump unit associated with the logical block. In some embodiments, the dump group generating module 402 identifies a dump unit associated with the logical block. In some embodiments, a write request may be received on a logical block that does not have its translation entry in memory. In that case, the dump group generating module 402 may fetch the on-media translation entry and then modify the entry corresponding to the new location where data is written. For example, the dump group generating module 402 retrieves the dump unit associated with the logical block from the storage device 110 and sends it to memory 212.

The method 1030 may then continue by updating 1036 the second translation table entry in the storage device 110 with the first translation table entry from the first dump unit. In one embodiment, the dump group generating module 402 may identify the second translation table entry (most recent translation table entry) associated with the logical block on the storage device 110 to perform operations therefrom.

Next, the method 1030 may then continue by storing 1038 the new translation table entry in the first dump unit. In one embodiment, the dump group generating module 402 may store the new translation table entry in the first dump unit. In some embodiments, the dump group generating module 402 may perform a write operation on the dump unit in the memory 212.

The method 1030 may then continue by updating 1040 the linked list in the storage device 110, the linked list referencing the updated second translation table entry in the storage device 110 through previous translation table entries associated with the logical block. In some embodiments, the linked list may be a reverse linked list. In one embodiment, the dump group generating module 402 may update the reverse linked list on the storage device 110 to perform operations therefrom.

Figure 10C:
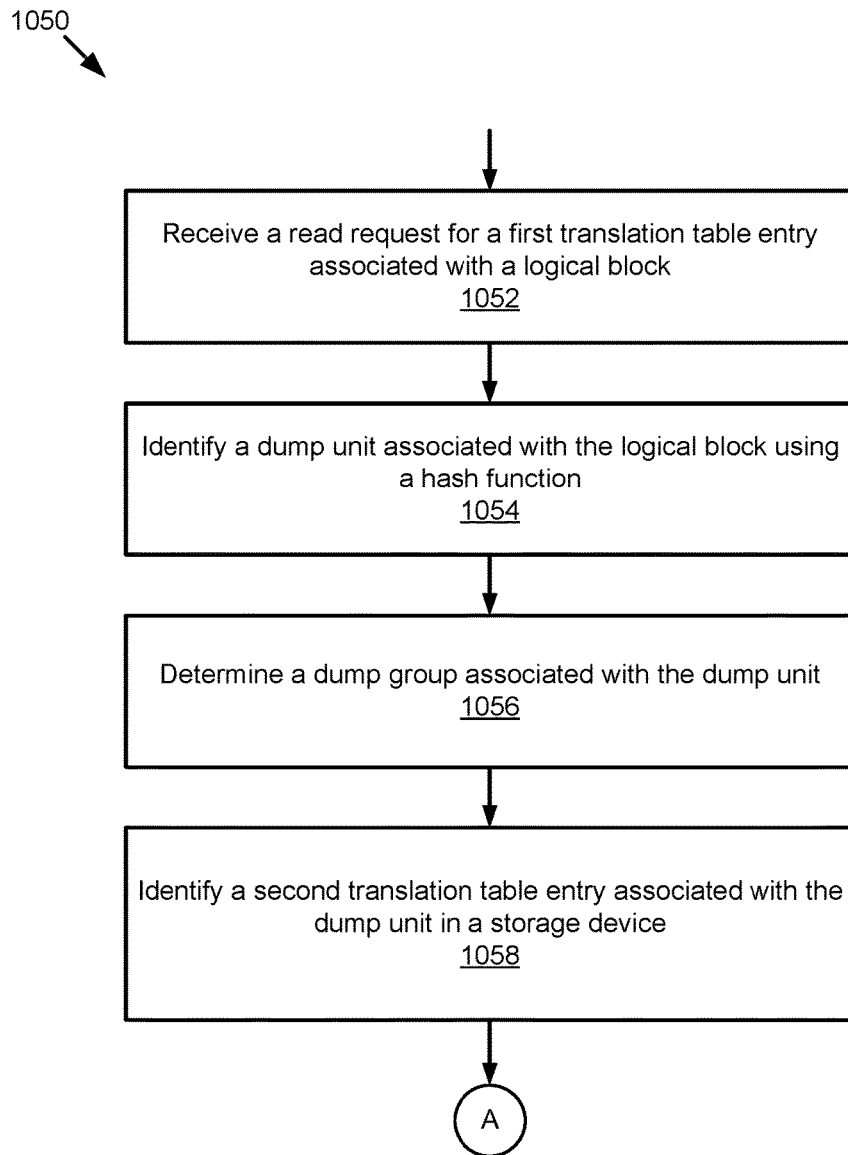
FIGS. 10C and 10D are flow charts of an example method for implementing a read request from a unified paged structure of translation tables, according to the techniques described herein.
Figure 10D:
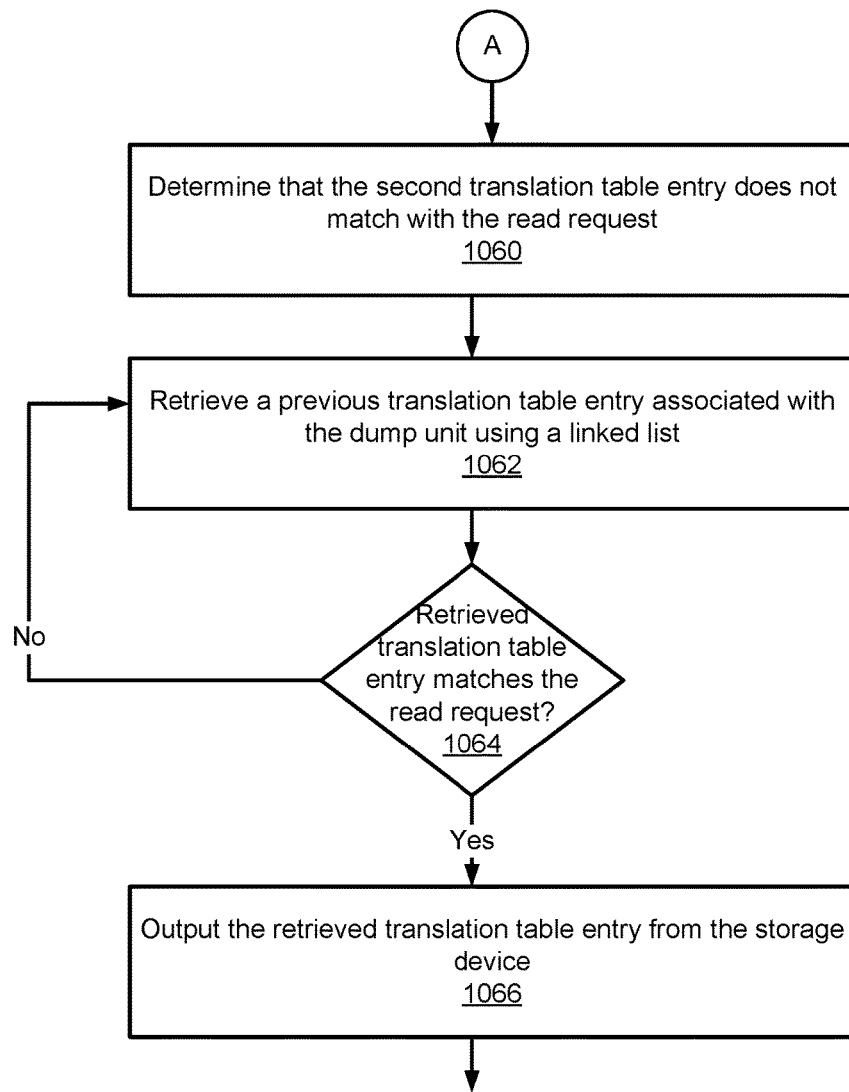

FIGS. 10C and 10D are flow charts of an example method 1050 for implementing a read request from a unified paged structure of translation tables. The method 1050 may begin by receiving 1052 a read request for a first translation table entry associated with a logical block. In some embodiments, the operations in step 1052 may be performed by dump group generating module 402 in cooperation with the input buffer 220 and one or more other entities of the storage logic 104. For instance, the dump group generating module 402 may receive the read request from the input buffer 220.

Next, the method 1050 advances by identifying 1054 a dump unit associated with the logical block using a hash function. The logical block may be mapped to a dump unit using the hash function. The hash function may be selected to well distribute logical blocks to various dump units as well as assign a few successive logical blocks to same dump unit to get locality benefit. In one embodiment, the dump group generating module 402 identifies the dump unit associated with the logical block using the hash function.

Next, the method 1050 advances by determining 1056 a dump group associated with the dump unit. In one embodiment, the dump group generating module 402 identifies a logical space reserved for the dump group. In one embodiment, the dump group generating module 402 identifies the dump group associated with the dump unit.

Next, the method 1050 can continue by identifying 1058 a second translation table entry associated with the dump unit in a storage device 110. In some embodiments, the second translation table entry may be a most recent translation table entry associated with the logical block stored in the storage device 110.

Referring now to FIG. 10D, the method 1050 advances by determining 1060 that the second translation table entry does not match with the read request. In one embodiment, the dump group generating module 402 may determine that the most recent translation table entry associated with the logical block does not match with the read request. For instance, the most recent translation table entry associated with the logical block may be stored in the storage device 110.

Next, the method 1050 can continue by retrieving 1062 a previous translation table entry associated with the dump unit using a reverse linked list from the storage device 110. In some embodiments, the reverse linked list generating module 404 may retrieve the previous translation table entry associated with the dump unit.

Next, the method 1050 can continue by determining whether 1064 the retrieved translation table entry matches the read request. In some embodiments, the dump group generating module 402 may identify that the retrieved translation table entry matches the translation table entry in the read request.

Responsive to determining that the retrieved translation table entry does not match the read request, the method 1050 can continues retrieving 1062 a previous translation table entry associated with the dump unit using a reverse linked list.

Responsive to determining that the retrieved translation table entry matches the read request, the method 1050 may continue by outputting 1066 the retrieved translation table entry from the storage device 110. The operations in step 1066 can be performed by the dump group generating module 402 in cooperation with one or more other entities of the storage logic 104.

Figure 11A:
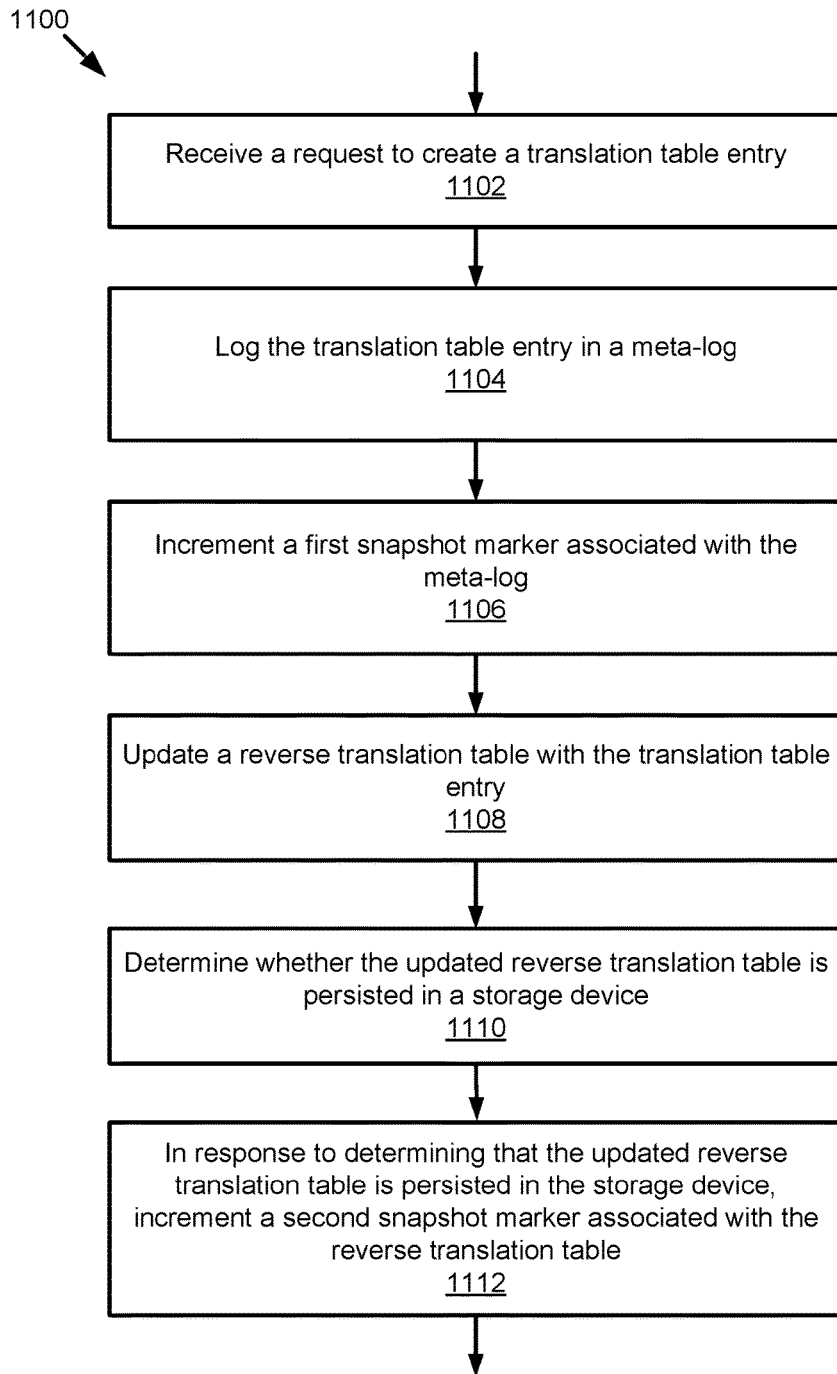
FIG. 11A is a flow chart of an example method for maintaining snapshot markers, according to the techniques described herein.

FIG. 11A is a flow chart of an example method 1100 for maintaining snapshot markers. The method 1100 may initiate by receiving 1102 a request to create a translation table entry. For instance, the unified paging module 202 may receive a request to create a translation table entry. In some embodiments, the request to create a translation table entry may be associated with, but not limited to, a request to create a forward translation table entry or a request to create a reverse translation table entry. In some embodiments, the dump group generating module 402 may create the translation table entry. In further embodiments, the operations in step 1102 may be performed by the dump group generating module 402 in cooperation with the input buffer 220 and one or more other entities of the system 100, as discussed elsewhere herein.

Next, the method 1100 may continue by logging 1104 the translation table entry in a meta-log 310.

In one embodiment, the meta-log 310 may be stored in the meta-log journal 310 in the memory 212. In further embodiments, the operations in step 1104 may be performed by the meta-log journal 310 stored in the memory 212 in cooperation with the input buffer 220 and one or more other entities of the data reduction unit 210.

The method 1100 may advance by incrementing 1106 a first snapshot marker associated with the meta-log 310. In some embodiments, a snapshot marker has a property of examining the system 100 and determining whether a translation table entry was created before or after the snapshot marker. In some embodiments, the timestamp log 306 stored in the memory 212 stores one or more snapshot markers associated with a translation table entry and increments a snapshot marker associated with a meta-log, upon determining that the translation table entry has been logged in the meta-log journal 310. In one embodiment, the snapshot marker can include a free running counter denoting time. For instance, the snapshot marker can include a timestamp of sufficient granularity associated with a translation table entry. In one embodiment, the snapshot marker may determine older vs. newer entries.

In some embodiments, the snapshot marker associated with a meta-log can include a free running counter associated with meta-log entries. For instance, each time a new translation table entry is created, the counter is incremented.

In one embodiment, the timestamp log 306 may determine that the write request is recorded by the meta-log journal 310 and may increment the snapshot marker associated with the meta-log. Further, in some embodiments, the incremented first snapshot marker associated with the meta-log may be stored in the timestamp log 306 in the memory 212.

The method 1100 may then continue by updating 1106 a reverse translation table with the translation table entry. In some embodiments, updates to the reverse translation map 304 may be periodically persisted in the storage device 110. In some embodiments, the reverse translation map 304 stored on the memory 212 maintains a reverse translation table including a plurality of reverse translation table entries. In further embodiments, the translation table entry may also be stored in the forward translation map 302. In some embodiments, the forward translation map 302 may be persisted in the storage device 110 whenever there is memory pressure or a threshold number of translation table entries have been accumulated.

Next, the method 1100 may determine 1110 whether the updated reverse translation table is persisted in the storage device 110.

In one embodiment, the unified paging module 202 may receive translation table entry from the input buffer 220 and sends the translation table entry to the reverse translation map 304 stored in the memory 212. In some embodiments, the unified paging module 202 in cooperation with the reverse translation map 304 may determine whether the updated reverse translation table is persisted in the storage device 110.

In response to determining that the updated reverse translation table is persisted in the storage device 110, the method 1100 may advance by incrementing 1112 a second snapshot marker associated with the reverse translation table. In some embodiments, the second snapshot marker may be a construct associated with the reverse translation table, that captures a point-in-time allowing unambiguous determination of whether a particular reverse translation table update happened before or after the second snapshot marker. In some embodiments, the timestamp log 306 stored in the memory 212 stores one or more snapshot markers associated with a translation table entry.

In some embodiments, the second snapshot marker associated with the reverse translation map 304 can be a counter associated with reverse translation table updates. For instance, each time a reverse translation table is persisted is the storage device 110, the counter is incremented. In one embodiment, the timestamp log 306 may store the first snapshot marker associated with the meta-log journal 310 and the second snapshot marker associated with the reverse translation map 304. Further, in some embodiments, a snapshot marker associated with the forward translation map 302 may also be stored in the timestamp log 306 in the memory 212. In some embodiments, the first snapshot marker and the second snapshot marker may be combined to reconstruct a translation table after an unplanned shutdown.

Figure 11B:
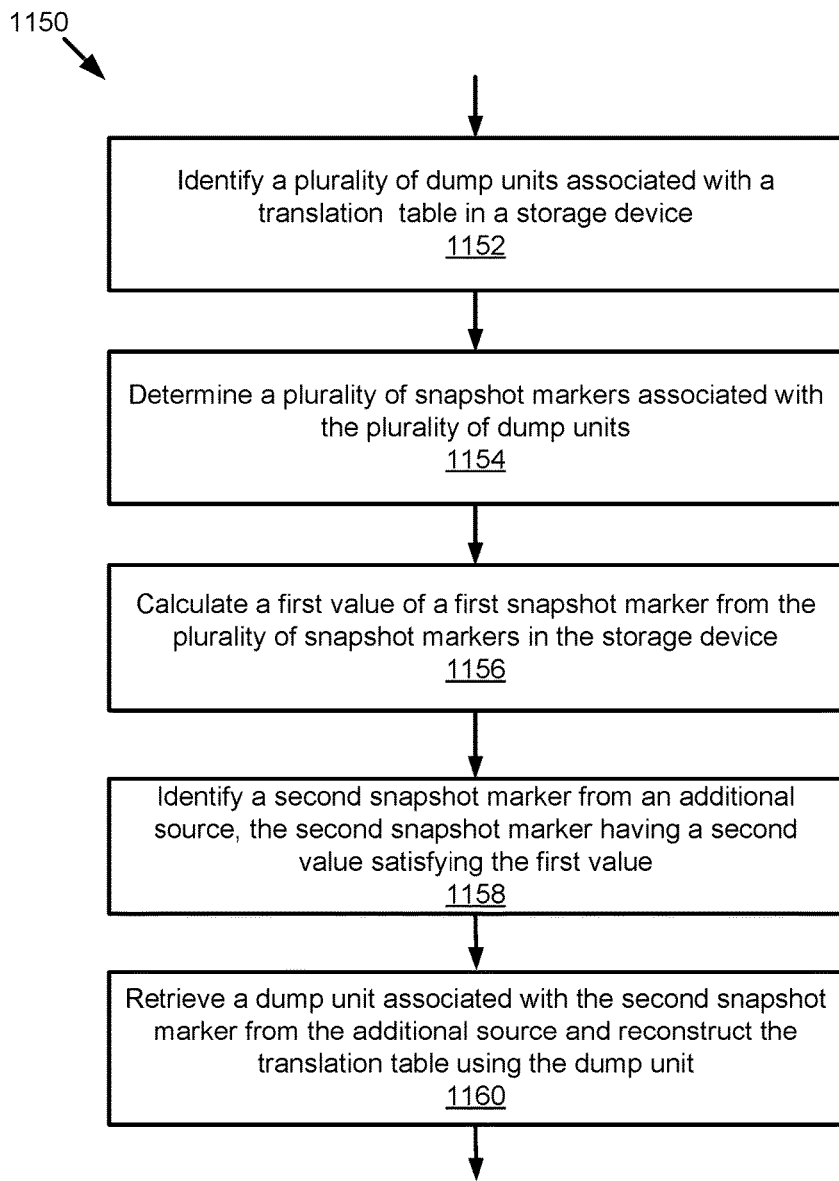
FIG. 11B is a flow chart of an example method for reconstructing a translation table using snapshot markers under constrained memory, according to the techniques described herein.

FIG. 11B is a flow chart of an example method 1150 for reconstructing a translation table using snapshot markers under constrained memory. The method 1150 may begin by identifying 1152 a plurality of dump units associated with a translation table in the storage device 110. In some embodiments, the reconstruction under constrained memory module 504 may receive a request to reconstruct the translation table. In some embodiments, the reconstruction under constrained memory module 504 may receive the request to reconstruct the translation table after an unplanned system shut down. In one embodiment, the reconstruction under constrained memory module 504 identifies the plurality of dump units associated with the translation table in cooperation with the dump group generating module 402. In some embodiments, the reconstruction under constrained memory module 504 receives the dump units included in a dump group stored in the storage device 110. The reconstruction under constrained memory module 504 receives the last persisted contents associated with the dump group.

Responsive to identifying the plurality of dump units associated with the translation table in the storage device 110, the method 1150 can continue by determining 1154 a plurality of snapshot markers associated with the plurality of dump units. In one embodiment, the reconstruction under constrained memory module 504 may determine the plurality of snapshot markers associated with the plurality of dump units based on a snapshot marker associated with each dump unit. For instance, the reconstruction under constrained memory module 504 may identify, the plurality of snapshot markers from the timestamp log 306 stored in the memory 212. In another embodiment, the plurality of snapshot markers associated with the plurality of dump units may also be stored in the storage device 110.

Next, the method 1150 may advance by calculating 1156 a first value of a first snapshot marker from the plurality of snapshot markers in the storage device 110. For instance, the reconstruction under constrained memory module 504 calculates a minimum value of the first snapshot marker from a first plurality of snapshot markers associated with the meta-log and a second plurality of snapshot marker associated with the reverse translation table. In one embodiment, the reconstruction under constrained memory module 504 computes the minimum value of the first snapshot marker. For instance, the reconstruction under constrained memory module 504 retrieves the plurality of snapshot markers associated with the plurality of dump units from the timestamp log 306 stored in the memory 212. Next, the reconstruction under constrained memory module 504 computes a minimum value from the plurality of snapshot markers. The reconstruction under constrained memory module 504 also determines that the minimum value is associated with the first snapshot marker.

The method 1150 may advance by identifying 1158 a second snapshot marker from an additional source, the second snapshot marker having a second value after or greater than the first value. In some embodiments, the second value is greater than the first value because a counter is incremented and the value of the counter is used for the timestamp of the snapshot maker. In some embodiments, the additional source may be the meta-log journal 310 or the reverse translation map 304. In one embodiment, the reconstruction under constrained memory module 504 receives the second snapshot marker from the timestamp log 306 stored in the memory 212. For instance, the reconstruction under constrained memory module 504 computes the second value associated with the second snapshot marker and determines that the second value is above a minimum value of the first snapshot marker.

Lastly, the method 1150 may continue by retrieving 1160 a dump unit associated with the second snapshot marker from the additional source and reconstruct the translation table using the dump unit. In one embodiment, the reconstruction under constrained memory module 504 in cooperation with the timestamp log 306 retrieves the dump unit associated with the second snapshot marker from the additional source. For instance, the reconstruction under constrained memory module 504 scans entries beyond the minimum snapshot marker from the reverse translation map 304 and/or the meta-log journal 310. In some embodiments, the reconstruction under constrained memory module 504 reconstructs the translation table using the retrieved dump unit. In some embodiments, the operations in step 1162 may be performed by the reconstruction under constrained memory module 504 in cooperation with the timestamp log 306, reverse translation map 304 and meta-log journal 310 and one or more other entities of the storage logic 104.

Figure 12A:
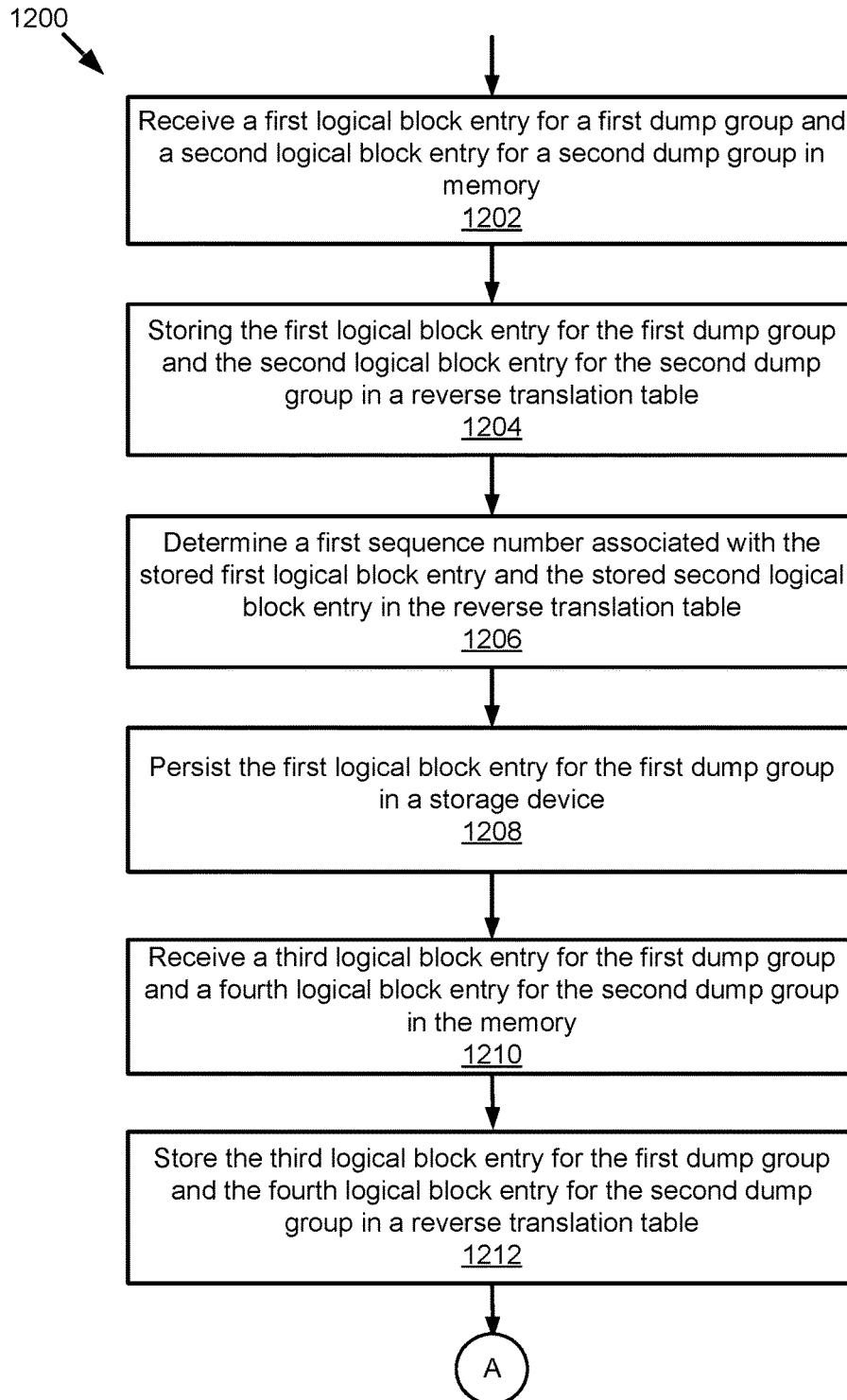
FIGS. 12A and 12B are flow charts of an example method for starting up under constrained memory conditions using two dump groups, according to the techniques described herein.
Figure 12B:
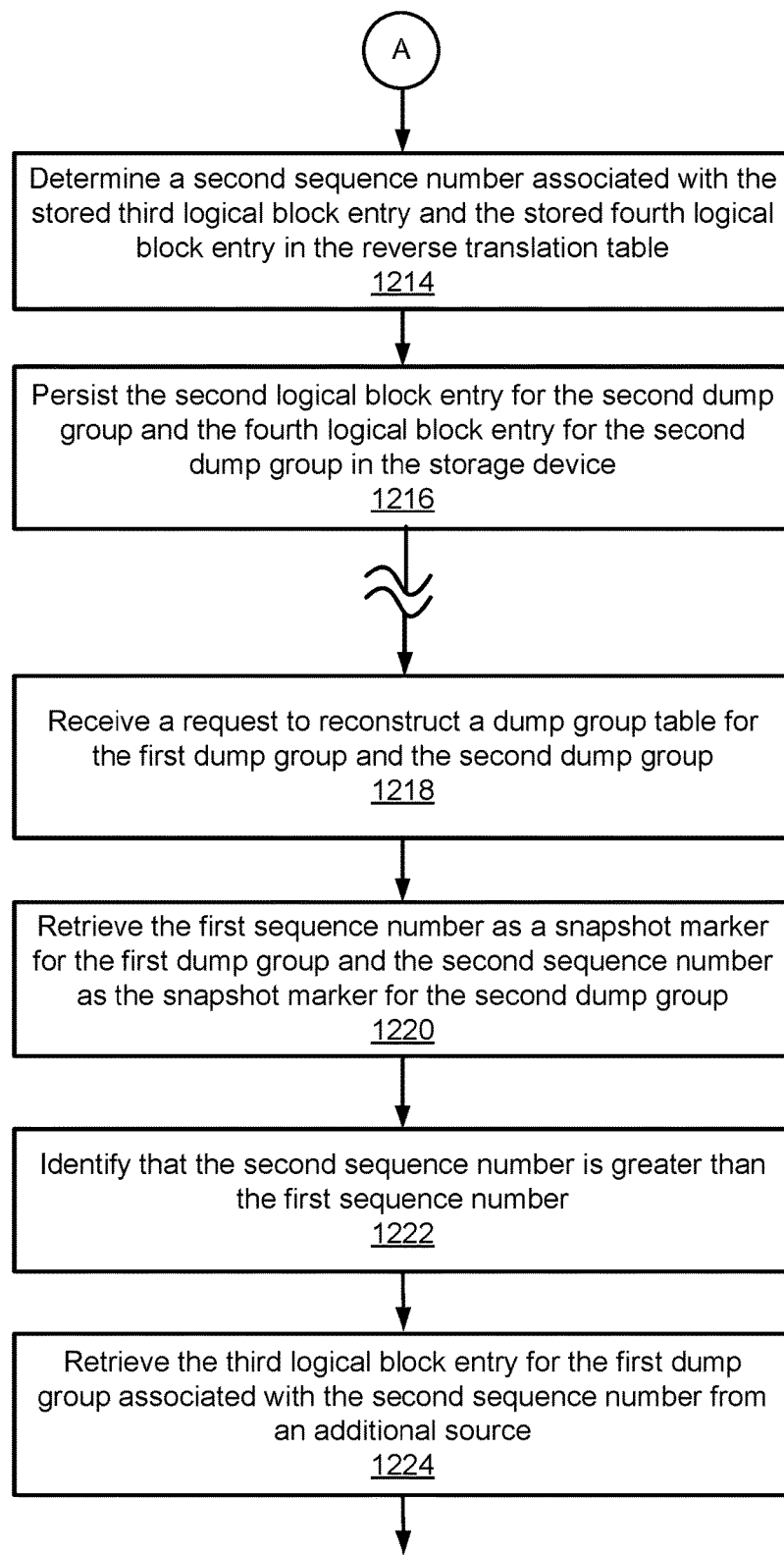

FIGS. 12A and 12B are flow charts of an example method 1200 for starting up under constrained memory conditions using two dump groups. The method 1200 may begin by receiving 1202 a first logical block entry for a first dump group and a second logical block entry for a second dump group in memory. In some embodiments, the operations in step 1202 may be performed by the unified paging module 202 in cooperation with the input buffer 220 and one or more other entities of the storage logic 104. For instance, the unified paging module 202 receives the first logical block entry and the second logical block entry for adding to the reverse translation map 304 stored in the memory 212.

Next, the method 1200 advances by storing 1204 the first logical block entry for the first dump group and the second logical block entry for the second dump group in a reverse translation table. In one embodiment, the first logical block entry for the first dump group and the second logical block entry for the second dump group may be stored in the reverse translation map 304 stored in the memory 212.

Next, the method 1200 advances by determining 1206 a first sequence number associated with the stored first logical block entry and the stored second logical block entry in the reverse translation table. In one embodiment, the unified paging module 220 determines the first sequence number associated with the stored first logical block entry and the stored second logical block entry and logs the first sequence number in the timestamp log 306 stored in the memory 212. For instance, the first sequence number associated with the stored first logical block entry and the stored second logical block entry may be a snapshot marker determining a timestamp associated with the first logical block and the second logical block.

Responsive to determining the first sequence number associated with the stored first logical block entry and the stored second logical block entry, the method 1200 can continue by persisting 1208 the first logical block entry for the first dump group in a storage media 110. In some embodiments, the unified paging module 202 may store the first dump group in the storage device 110.

Next, the method 1200 may receive 1210 a third logical block entry for the first dump group and a fourth logical block entry for the second dump group in the memory. In some embodiments, the operations in step 1210 may also be performed by the unified paging module 202 in cooperation with the input buffer 220 and one or more other entities of the storage logic 104. For instance, the unified paging module 202 receives the third logical block entry for the first dump group and the fourth logical block entry for the second dump group for adding to the reverse translation map 304 stored in the memory 212.

Next, the method 1200 advances by storing 1212 the third logical block entry for the first dump group and the fourth logical block entry for the second dump group in the reverse translation table. In one embodiment, the third logical block entry for the first dump group and the fourth logical block entry for the second dump group may be stored in the reverse translation map 304 stored in the memory 212.

Referring now to FIG. 12B, the method 1200 advances by determining 1214 a second sequence number associated with the stored third logical block entry and the stored fourth logical block entry in the reverse translation table. In one embodiment, the unified paging module 220 determines the second sequence number associated with the stored third logical block entry and the stored fourth logical block entry and logs the second sequence number in the timestamp log 306 stored in the memory 212. For instance, the second sequence number associated with the second sequence number associated with the stored third logical block entry and the stored fourth logical block entry may be a snapshot marker determining a timestamp associated with the second sequence number associated with the third logical block and the fourth logical block.

Responsive to determining the second sequence number associated with the stored third logical block entry and the stored fourth logical block entry, the method 1200 can continue by persisting 1216 the second logical block entry for the second dump group and the fourth logical block entry for the second dump group in the storage media 110. In some embodiments, the unified paging module 202 may store the second dump group in the storage device 110. In some embodiments, memory corresponding to the second dump group is reclaimed after determining that the second dump group is persisted in the storage device 110. The steps 1202-1216 describe an ongoing process for maintaining a snapshot markers for dump groups, and may be performed repeatedly in some embodiment before the method proceeds to block 1218.

The method 1200 may continue by receiving 1218 a request to reconstruct a dump group table in for the first dump group and the second dump group. In one embodiment, the reconstruction under constrained memory module 504 receives a request to reconstruct the dump group table for the first dump group and the second dump group. The reconstruction under constrained memory module 504 may receive the request to reconstruct after an unplanned shutdown and system restart. Next, the method 1200 advances by retrieving 1220 the first sequence number as a snapshot marker for the first dump group and the second sequence number as the snapshot marker for the second dump group. The operations in step 1220 may be performed by the reconstruction under constrained memory module 504 in cooperation with the timestamp log 306 and one or more other entities of the storage logic 104.

Next, the method 1200 may continue by identifying 1222 that the second sequence number is greater than the first sequence number. In one embodiment, reconstruction under constrained memory module 504 retrieves the first sequence number and the second sequence number from the timestamp log 306 stored in the memory 212.

Lastly, the method 1200 may continue by retrieving 1224 the third logical block entry for the first dump group associated with the second sequence number from an additional source. In one embodiment, reconstruction under constrained memory module 504 retrieves the third logical block entry for the first dump group from the reverse translation map 304 stored in the memory 212. In another embodiment, reconstruction under constrained memory module 504 retrieves the third logical block entry for the first dump group from the meta-log journal 310 stored in the memory 212. The operations in step 1224 can be performed by the reconstruction under constrained memory module 504 in cooperation with one or more other entities of the storage logic 104.

Figure 13A:
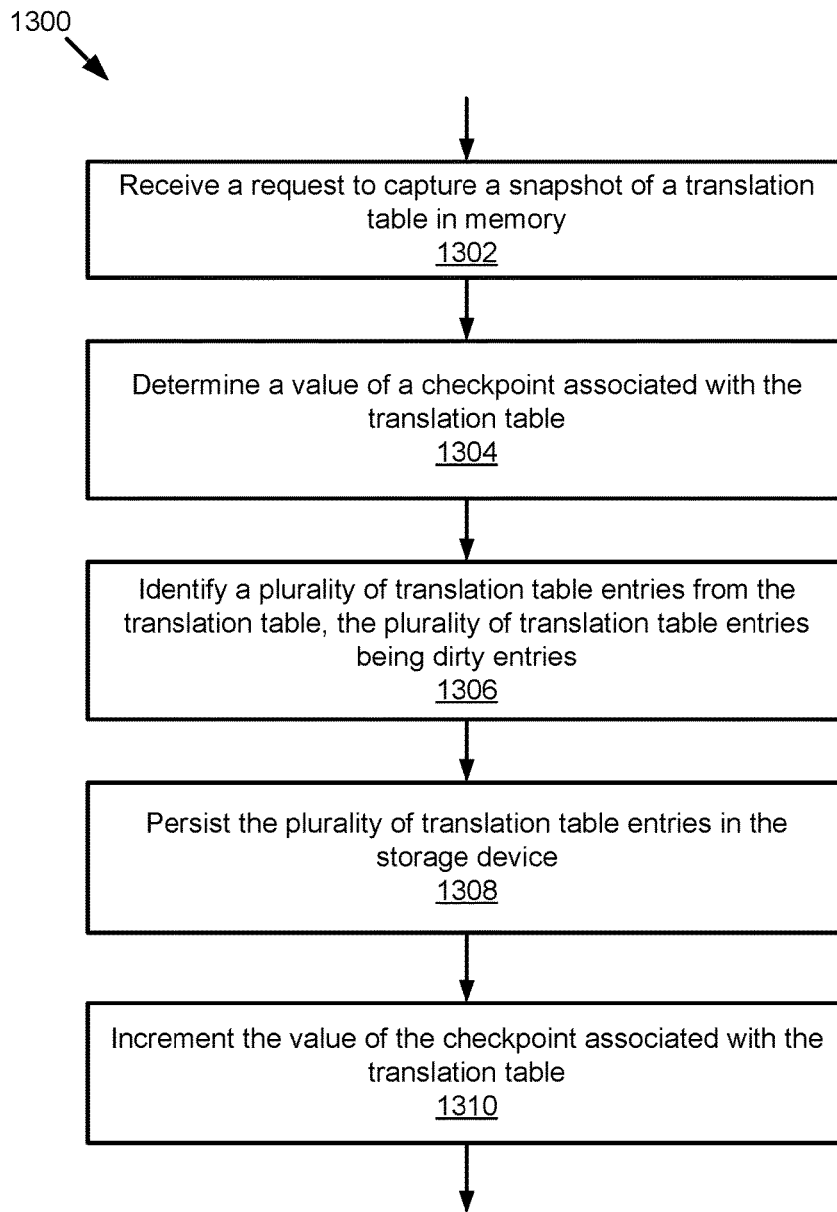
FIG. 13A is a flow chart of an example method for maintaining translation table checkpoints, according to the techniques described herein.

FIG. 13A is a flow chart of an example method 1300 for maintaining translation table checkpoints. In some embodiments, the method 1300 may initiate periodically after a threshold time interval. In some other embodiments, the method 1300 may initiate after receiving a request to maintain checkpoints associated with translation table. The method 1300 may initiate by receiving 1302 a request to capture a snapshot of a translation table in memory 212. For instance, the translation table checkpoint module 602 may receive the request to capture the snapshot of the translation table. In some embodiments, the snapshot of the translation table includes of a map dump table and all a translation table entries that are non-persisted in the storage device 110 and need to be persisted before they can be purged from memory 212. In some embodiments, the method 1300 periodically takes the snapshot of the translation table and persists it in the storage device 110. In further embodiments, the operations in step 1302 may be performed by the translation table checkpoint module 602 in cooperation with one or more other entities of the system 100.

Next, the method 1300 may continue by determining 1304 a value of a checkpoint associated with the translation table. In some embodiments, the value of the checkpoint associated with the translation table may be a monotonically increasing number. In some embodiments, the translation table checkpoint module 602 may determine the value of the checkpoint associated with the translation table from the timestamp log 306 stored in the memory 212.

The method 1300 may then continue by identifying 1306 a plurality of translation table entries from the translation table, the plurality of translation table entries being dirty entries. In some embodiments, the plurality of translation table entries are not persisted in the storage device 110. In some embodiments, the reverse translation map 304 stored on the memory 212 maintains a reverse translation table including a plurality of reverse translation table entries. In further embodiments, the translation table entry may also be stored in the forward translation map 302. In some embodiments, the forward translation map 302 may be persisted in the storage device 110 whenever there is a request to free up memory space or whenever a threshold number of translation table entries have been accumulated.

Next, the method 1300 may persist 1308 the plurality of translation table entries in the storage device 110.

The method 1300 may advance by incrementing 1310 the value of the checkpoint associated with the translation table. In some embodiments, the checkpoint may be a construct associated with the reverse translation table, that captures a point-in-time allowing unambiguous determination of whether a particular reverse translation table update happened before or after the checkpoint. In some embodiments, the timestamp log 306 stored in the memory 212 stores the value of the checkpoint associated with the translation table.

Figure 13B:
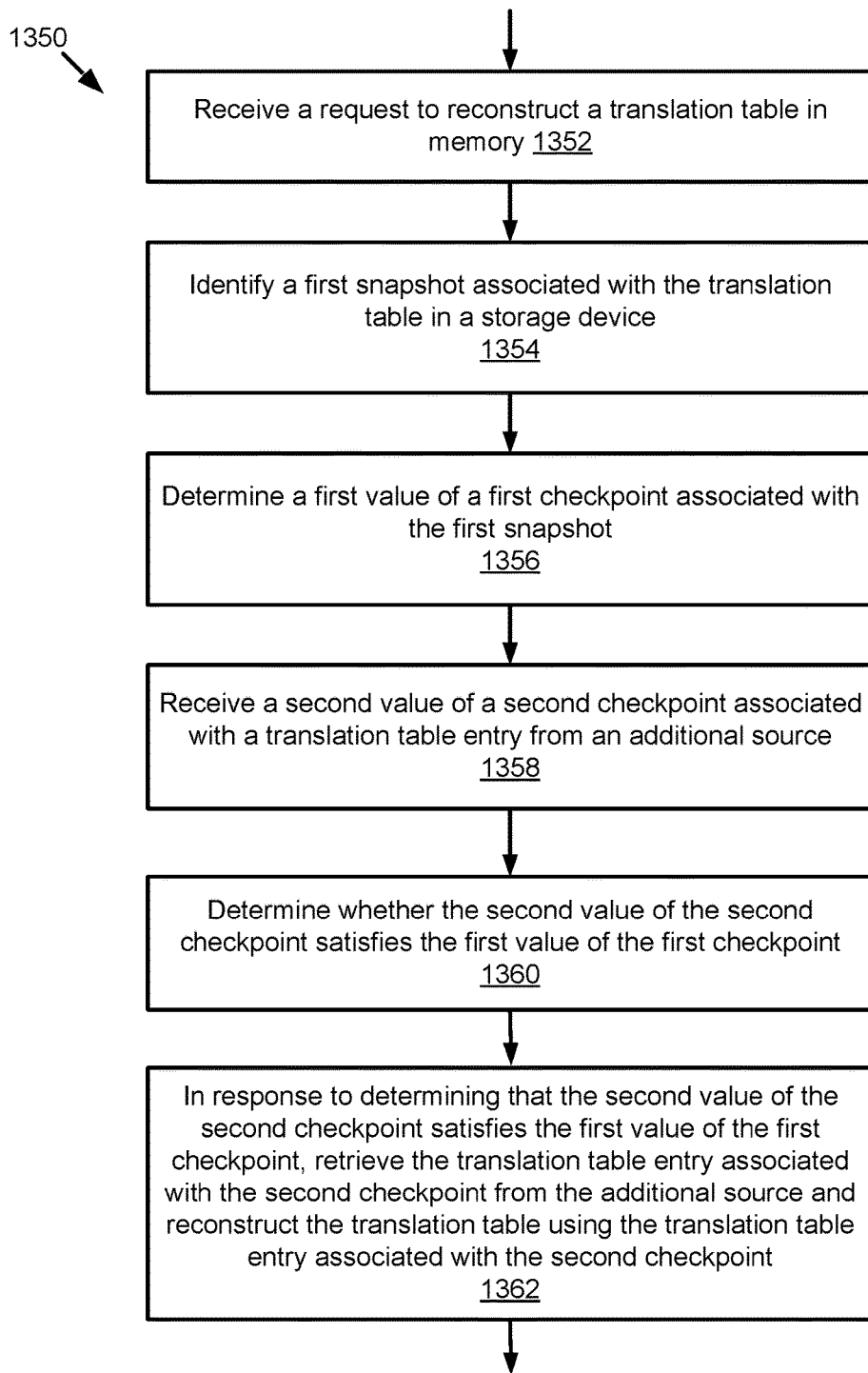
FIG. 13B is a flow chart of an example method for reconstructing a translation table using translation table checkpoints, according to the techniques described herein.

FIG. 13B is a flow chart of an example method 1350 for reconstructing a translation table using translation table checkpoints. The method 1350 may initiate by receiving 1352 a request to reconstruct a translation table in memory 212. For instance, the translation table checkpoint based reconstruction module 604 may receive the request to reconstruct a translation table in the memory 212. In some embodiments, the operations in step 1352 may be performed by the translation table checkpoint based reconstruction module 604 in cooperation with the timestamp log 306 and one or more other entities of the system 100, as discussed elsewhere herein.

Next, the method 1350 may continue by identifying 1354 a first snapshot associated with the translation table in a storage device 110. For instance, the first snapshot may be a most recent snapshot of the translation table persisted in the storage device 110. In some embodiments, translation table checkpoint based reconstruction module 604 may identify the first snapshot associated with the translation table in the storage device 110.

The method 1350 may advance by determining 1356 a first value of a first checkpoint associated with the first snapshot. In some embodiments, the translation table checkpoint based reconstruction module 604 may determine the first value of the first checkpoint associated with the first snapshot from the timestamp log 306 stored in the memory 212. For instance, the first value of the first checkpoint may be a value of a counter associated with the translation table snapshot.

The method 1350 may then continue by receiving 1358 a second value of a second checkpoint associated with a translation table entry from an additional source. In some embodiments, the translation table checkpoint based reconstruction module 604 may receive the second value of the second checkpoint associated with a translation table entry from an additional source. The additional source may be the reverse translation map 304 and the meta-log journal 310 stored in the memory 212.

Next, the method 1350 may determine 1360 whether the second value of the second checkpoint is after (or greater) the first value of the first checkpoint. In one embodiment, the translation table checkpoint based reconstruction module 604 may determine whether the second value of the second checkpoint is greater than the first value of the first checkpoint. In some embodiments, the first checkpoint may indicate a first timestamp associated with the first snapshot and the second checkpoint may indicate a second timestamp associated with the second snapshot. In some embodiments, the operations in step 1360 may be performed by the translation table checkpoint based reconstruction module 604 in cooperation with the timestamp log 310 and one or more other entities of the system 100, as discussed elsewhere herein.

In response to determining that the second value of the second checkpoint is after or greater than the first value of the first checkpoint, the method 1350 may continue by retrieving 1362 the translation table entry associated with the second checkpoint from the additional source and reconstruct the translation table using the translation table entry associated with the second checkpoint. In some embodiments, the translation table checkpoint based reconstruction module 604 may retrieve the translation table entry associated with the second checkpoint from the reverse translation map 304 and the timestamp log 310.

Figure 14A:
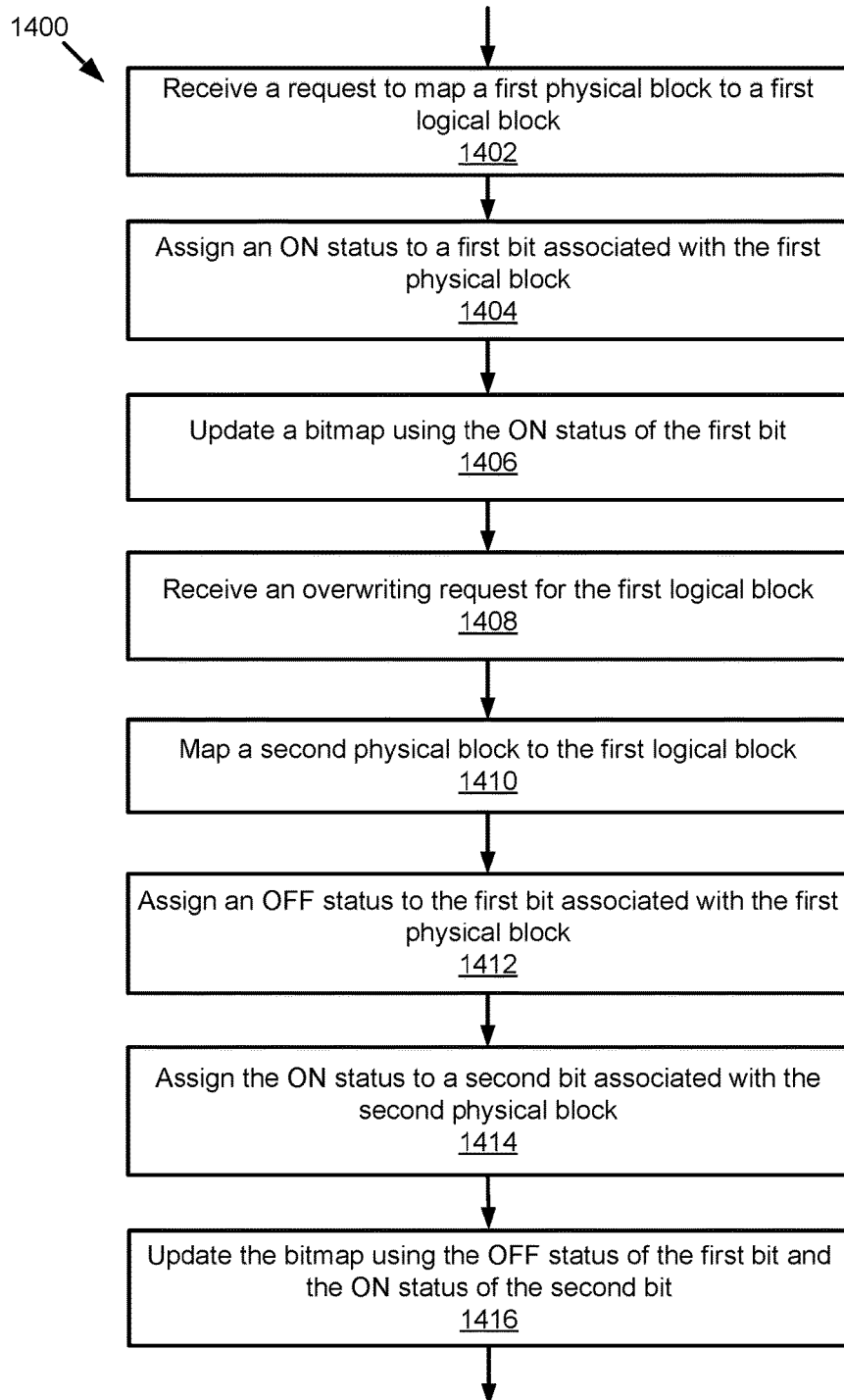
FIG. 14A is a flow chart of an example method for maintaining a bitmap, according to the techniques described herein.

FIG. 14A is a flow chart of an example method for maintaining a bitmap. The method 1400 may initiate by receiving 1402 a request to map a first physical block to a first logical block. The request to map the first physical block to the first logical block may be in response to a write request. A write request allocates a new physical block to the logical block were the data being written will be stored. In other instances, the garbage collection optimization module 704 may receive a request to map the first physical block to the first logical block. In some embodiments, the operations in step 1402 may be performed by the garbage collection optimization module 704 in cooperation with the bitmap 308 and one or more other entities of the system 100, as discussed elsewhere herein.

Next, the method 1400 may continue by assigning 1404 an ON status to a first bit associated with the first physical block. In one embodiment, the ON status associated with the first bit may be stored in the bitmap 308 in the memory 212. In some embodiments, the garbage collection optimization module 704 may assign an ON status to a bit corresponding to a physical block, if an active mapping exists between the physical block and a logical block.

The method 1400 may advance by updating 1406 a bitmap using the ON status of the first bit. In some embodiments, the garbage collection optimization module 704 may update the bitmap 308 stored in the memory 212 with the status of the first bit.

The method 1400 may then continue by receiving 1408 an overwriting request for the first logical block. For instance, the overwrite request for the first logical block may be in response to a move request, a delete request, or a modify request associated with the first logical block. In some embodiments, the garbage collection optimization module 704 may receive the overwriting request for the first logical block. The overwriting request may include a request to create a new mapping of the first logical block.

Next, the method 1400 may map 1410 a second physical block to the first logical block. In one embodiment, the garbage collection optimization module 704 may receive a request to map the second physical block to the first logical block. In some embodiments, the operations in step 1410 may be performed by the garbage collection optimization module 704 in cooperation with the bitmap 308 and one or more other entities of the system 100, as discussed elsewhere herein.

Next, the method 1400 may continue by assigning 1412 an OFF status to the first bit associated with the first physical block. In one embodiment, the OFF status associated with the first bit may be stored in the bitmap 308 in the memory 212. In some embodiments, the garbage collection optimization module 704 may assign an OFF status to a bit corresponding to a physical block, if no active mapping exists between the physical block and a logical block.

The method 1400 may then continue by assigning 1414 the ON status to a second bit associated with the second physical block. In one embodiment, the ON status associated with the second bit may be stored in the bitmap 308 in the memory 212.

Next, the method 1400 may update 1416 the bitmap using the OFF status of the first bit and the on status of the second bit. In some embodiments, the garbage collection optimization module 704 may update the bitmap 308 stored in the memory 212 with the status of the first bit and the second bit. In some embodiments, the bitmap 308 may be periodically persisted in the storage device 110.

Figure 14B:
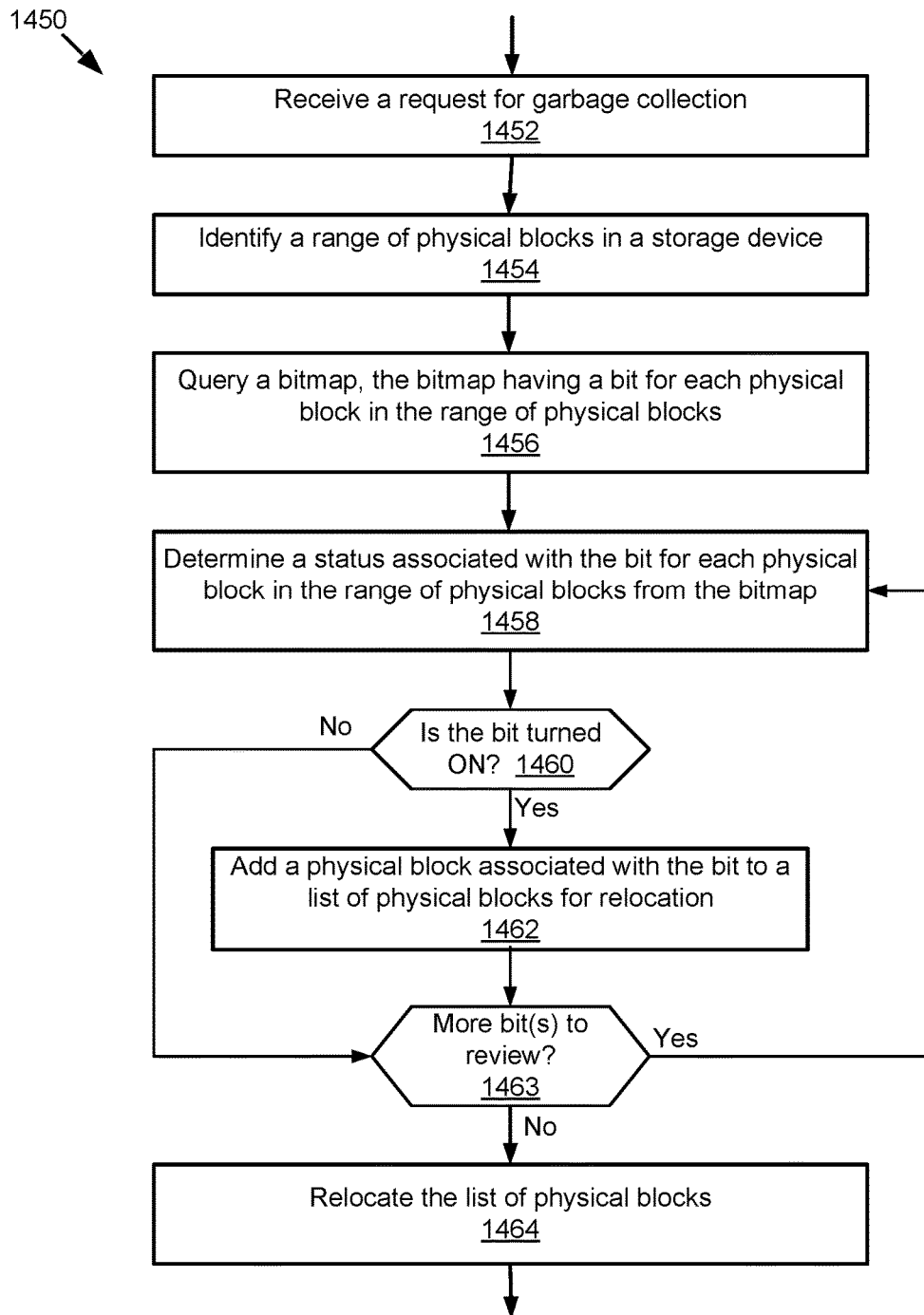
FIG. 14B is a flow chart of an example method for garbage collection optimization, according to the techniques described herein.

FIG. 14B is a flow chart of an example method 1450 for garbage collection optimization. The method 1450 may initiate by receiving 1452 a request for garbage collection. For instance, the garbage collection optimization module 704 may receive a request for garbage collection in the memory 212. In some embodiments, the operations in step 1452 may be performed by the garbage collection optimization module 704 in cooperation with the bitmap 308 and one or more other entities of the system 100, as discussed elsewhere herein.

Responsive to the request, the method 1450 may continue by identifying 1454 a range of physical blocks in a storage device 110. In one embodiment, the garbage collection optimization module 704 may identify a chunk of physical blocks in the storage device 110.

The method 1450 may then continue by querying 1456 a bitmap, the bitmap having a bit for each physical block in the range of physical blocks. In one embodiment, the garbage collection optimization module 704 may query the bitmap 308 in the memory 212. In some embodiments, the bitmap may include a bit for each physical block of the storage device 110. In some embodiments, the size of the bitmap corresponds to a physical size of the storage device 110.

The method 1450 may advance determining 1458 a status associated with the bit for each physical block in the range of physical blocks from the bitmap. In some embodiments, the garbage collection optimization module 704 may determine the status associated with each bit associated with each physical block in the range of physical blocks from the bitmap 308 stored in the memory 212. In some embodiments, the status is determined one bit at time. Next, the method 1450 determines whether the bit is turned ON. If not, the method 1450 proceeds to block 1463 as will be described below. If the bit is turned ON, then the method 1450 may then continue by adding 1462 a physical block associated with the bit to a list of physical blocks for relocation. In some embodiments, the garbage collection optimization module 704 in response to a garbage collection request, may select the list of physical blocks for relocation from the storage device 110.

After block 1462 or block 1460, the method 1450 determines 1463 whether there are additional bits in the bitmap 308 whose status needs to be determined. If so, the method 1450 may then return to block 1458 to determine the status of another bit in the bitmap 308 and perform block 1460, 1462 and 1463 for that bit. The process continues until the status each bit in the bitmap 308 has been determined. If the method 1450 determines 1463 there is not another bit in the bitmap 308 to whose status needs to be determined, the method 1450 proceeds to block 1464 where the list of physical blocks identified in block 1462 are relocated 1464.

FIGS. 15A and 15B are example graphical representations 1500 to show how paged translation maps are preserved in the memory 212 to increase their usage. As depicted in FIG. 15A, a first node (hot node) 1502 may include logical blocks L1, L5, L9 and L13 as illustrated. The first node 1502 may be a first chunk of the memory 212. For instance, the first node 1502 can be associated with a first group of logical blocks and can be stored in the memory 212. The first node 1502 is the hot node meaning that it includes frequently accessed logical blocks. The first node 1502 includes frequently accessed logical blocks L1, L5, L9 and L13. The first node 1502 includes a pointer 1508 pointing at the next entry to be replaced in the first node 1502. In some embodiments, a frequently accessed logical block is determined using a status of an access bit associated with the frequently accessed logical block. For example, the access bit associated with the frequently accessed logical block has an ON status. The next entry to replace pointer 1508 points to a less frequently used accessed logical block within the hot node. For instance, the next entry to replace pointer 1508 may point to a logical block which will be relocated from the first (hot) node 1502 if a new logical block (not present in the hot node 1502) is accessed. In the example of FIG. 15A, the pointer 1508 points to logical block L1.

The second node (cold node) 1504, as depicted in FIG. 15A may include logical blocks at time t0 as illustrated. The second node 1504 may be a second chunk or portion of the memory 212. For instance, the second node 1504 can be associated with a second group of logical blocks and can be stored in the memory 212. The second node 1504 includes less frequently accessed logical blocks L2, L6, L10 and L14. In some embodiments, after a threshold amount of memory consumption, the less frequently accessed logical blocks from the cold node 1504 may be paged out to storage media 110. The first node 1502 and the second node 1504, as depicted in FIG. 15A represents the state of the frequently accessed logical blocks and the rarely accessed logical blocks at time t0.

The hot node 1512 and the cold nodes 1514, as depicted in FIG. 15B represents the state of the frequently accessed logical blocks and the less frequently accessed logical blocks at time t1. At time t1, translation table entry for logical block L3 was accessed. A translation table entry for logical block L3 was be created after time t0 but before time t1. As the logical block L3 was not present in the first node 1502 and the second node 1504, the translation entry for L3 was fetched from storage device 110 and added to the first node 1502 (hot node) at the slot pointed to by the pointer 1508. The logical block L3 replaced the logical block L1, as illustrated in the FIG. 15B and the logical block L1 was moved to the second node 1504. In some embodiments, an access bit associated with the logical block L3 is updated to an ON status. The next entry to replace pointer 1508 identifies logical blocks to replace from the hot node 1512 by traversing the hot node 1512 in a full cycle. In some embodiments, L3 remains in the hot node 1512 for at least one full cycle of the next entry to replace pointer 1508 to walk through the hot node 1512. In some embodiments, if L3 is accessed again, the access bit associated with L3 is turned ON for another cycle of the next entry to replace pointer 1508. The hot node 1502 from time t0 is updated to the hot node 1512 at time t1.

The hot node 1512 including logical blocks L3, L5, L9 and L13 at time t1 is shown in FIG. 15B. For instance, the hot node 1512 includes frequently accessed logical blocks L3, L5, L9 and L13. The hot node 1512 is updated so the next entry to replace pointer 1508 points at the next entry to replace in the hot node 1512, specifically logical block L5. The hot node 1512 includes frequently accessed logical blocks (most frequently accessed logical block being L3). The next entry to replace pointer 1508 points to a logical block within the hot node 1512 that was the last to be accessed. For instance, the next entry to replace pointer 1508 may point to a logical block which will be relocated from the hot node 1512 if a new logical block (not present in the hot node 1512) is accessed. In the example of FIG. 15B, the pointer 1508 points to logical block L5.

As depicted in FIG. 15B, a second node (cold node) 1514 at time t1 may include the logical block L1 as illustrated. For instance, the second node 1514 also includes less frequently accessed logical blocks L2, L6, L10 and L15. In response to a request to memory reclaim, logical blocks from the cold node 1514 may be paged out of the memory 212.

Figure 16:
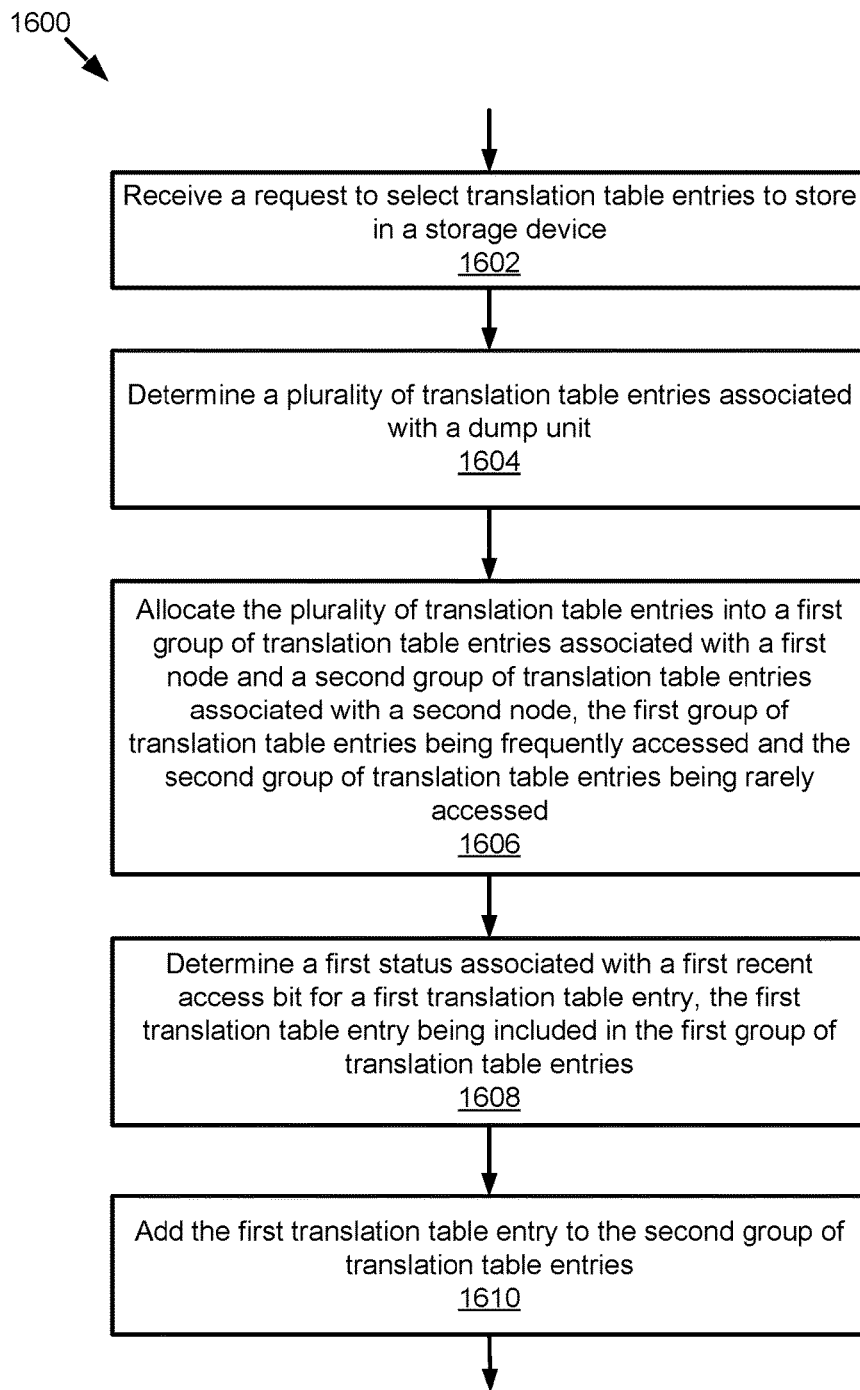
FIG. 16 is a flow chart of an example method for tracking translation table entries in memory, according to the techniques described herein.

FIG. 16 is a flow chart of an example method 1600 for tracking translation table entries in memory 212. The method 1600 may initiate by receiving 1602 a request to select translation table entries to store in a storage device 110. In some embodiments, the translation table entries may be purged out of memory to store in the storage device 110. In some embodiments, the request to a request to select translation table entries in a dump unit may be associated with, but not limited to, a request to select a forward translation table entry in a dump unit and a request to select a reverse translation table entry in the dump unit. In further embodiments, the operations in step 1602 may be performed by the translation table preserving module 804 in cooperation with the dump group generating module 402 and one or more other entities of the system 100, as discussed elsewhere herein.

Next, the method 1600 may continue by determining 1604 a plurality of translation table entries associated with a dump unit. In some embodiments, the dump group generating module 402 may identify the plurality of translation table entries associated with the dump unit.

The method 1600 may advance by allocating 1606 the plurality of translation table entries into a first group of translation table entries associated with a first node and a second group of translation table entries associated with a second node, the first group of translation table entries being frequently accessed and the second group of translation table entries being less frequently accessed. In some embodiments, the translation table preserving module 804 may divide the plurality of translation table entries into the first group of translation table entries and the second group of translation table entries. In some embodiments, the translation table preserving module 804 may determine the first node and the second node based on a ratio of a total number translation table entries in the memory 212 to a total number of translation table entries in the storage device 110.

The method 1600 may then continue by determining 1608 a first status associated with a first recent access bit for a first translation table entry, the first translation table entry being included in the first group of translation table entries. In some embodiments, the translation table preserving module 804 may assign a recent access bit to each translation table entry in the first group of translation table entries. The recent access bit is turned ON whenever the translation table entry associated with the recent access bit is accessed. In some embodiments, the recent access bit is turned OFF when the translation table entry is accessed before a threshold time.

In some embodiments, the translation table preserving module 804 may receive a request to access a second translation table entry. In response to receiving the request to access the second translation table entry, the translation table preserving module 804 may assign an ON status to a second recent access bit associated with the second translation table entry and add the second translation table entry to the first group of translation table entries. In some embodiments, the first translation table entry may be stored in the reverse translation map 304. In further embodiments, the first translation table entry may also be stored in the forward translation map 302.

Next, the method 1600 may add 1610 the first translation table entry to the second group of translation table entries. In one embodiment, the translation table preserving module 804 may add the first translation table entry to the second group of translation table entries in response to determining that the recent access bit associated with the first translation table entry is turned OFF. In some embodiments, the translation table preserving module 804 may relocate the second group of translation table entries from the memory 212, in response to a request of memory reclaim.

In some embodiments, the translation table preserving module 804 may receive a request to relocate translation table entries to the storage device 110. The translation table preserving module 804 may select the first translation table entry from the second group of translation table entries to relocate to the storage device 110.

Figure 17A:
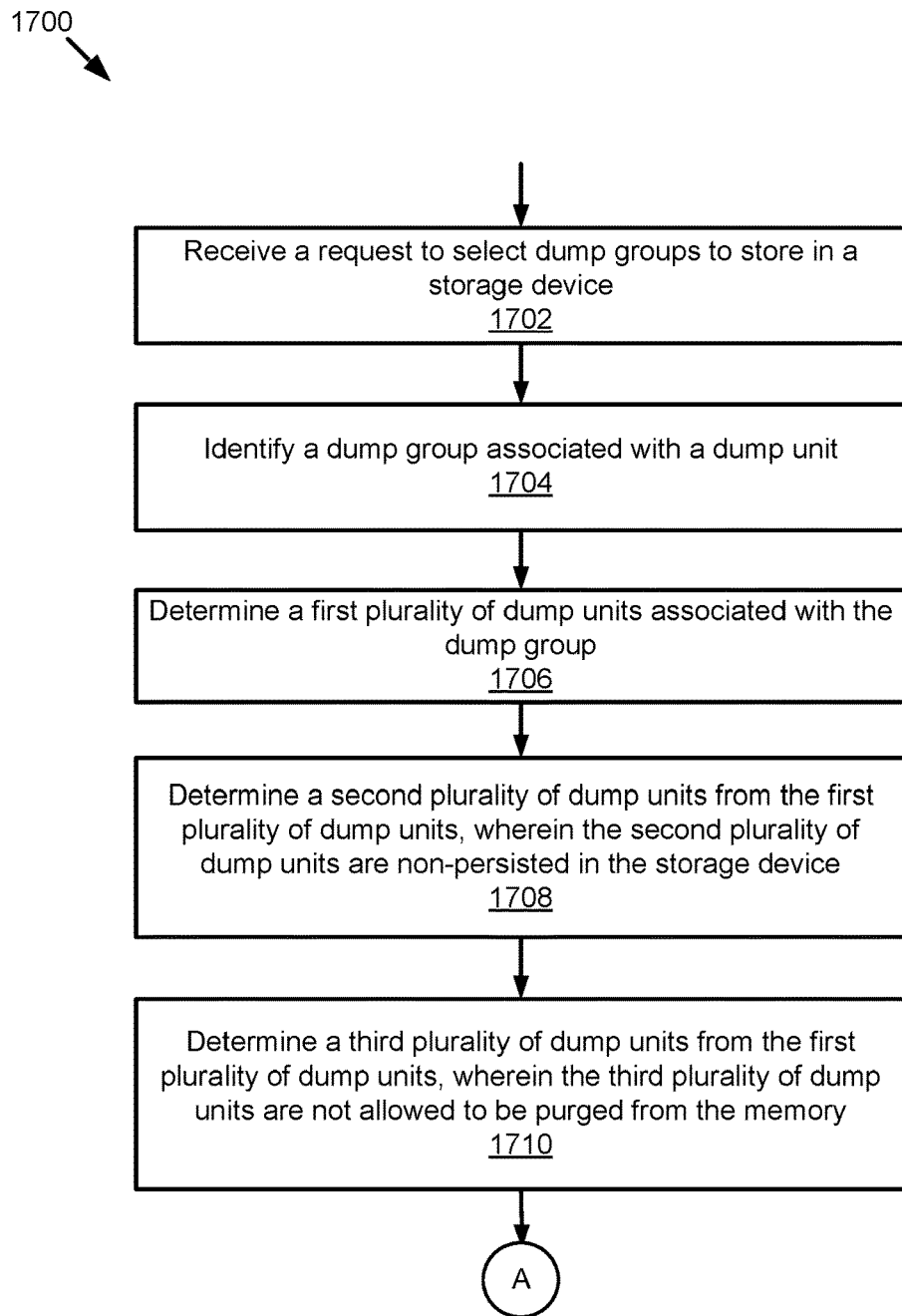
FIGS. 17A and 17B are flow charts of an example method for maintaining a multi-level linked list for translation table entries, according to the techniques described herein.
Figure 17B:
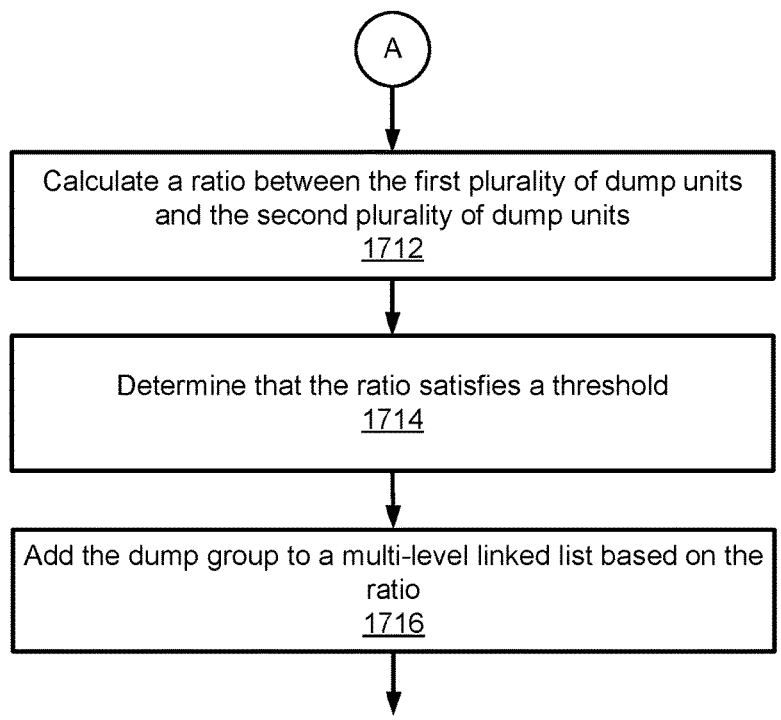

FIGS. 17A and 17B are flow charts of an example method for maintaining a multi-level linked list for translation table entries. The method 1700 may begin by receiving 1702 a request to select dump groups to store in a storage device 110. In some embodiments, the operations in step 1702 may be performed by the translation table tracking module 802 in cooperation with the unified paging module 202 and one or more other entities of the storage logic 104. For instance, the translation table tracking module 802 receives the request to select a dump group associated with a dump unit stored in the memory 212. In some embodiments, the unified paging module 202 may identify the dump unit.

Next, the method 1700 advances by identifying 1704 a dump group associated with a dump unit. In one embodiment, the unified paging module 202 identifies the dump group associated with the dump unit.

Next, the method 1700 advances by determining 1706 a first plurality of dump units associated with the dump group. In one embodiment, the translation table tracking module 802 determines the first plurality of dump units associated with the dump group in cooperation with the unified paging module 202.

Next, the method 1700 can continue by determining 1708 a second plurality of dump units from the first plurality of dump units, wherein the second plurality of dump units are non-persisted in the storage device 110. In some embodiments, the translation table tracking module 802 may determine the second plurality of dump units from the first plurality of dump units, wherein the second plurality of dump units are not backed up in the storage device 110.

Next, the method 1700 may determine 1710 third plurality of dump units from the first plurality of dump units, wherein the third plurality of dump units are not allowed to be purged from the memory. In some embodiments, the operations in step 1710 may also be performed by the translation table tracking module 802 in cooperation with the pinning module 702 and one or more other entities of the storage logic 104. For instance, the translation table tracking module 802 determines that the third plurality of dump units are pinned in the memory 212.

Referring now to FIG. 17B, the method 1700 advances by calculating 1712 a ratio between the first plurality of dump units and the second plurality of dump units. In one embodiment, the translation table tracking module 802 may calculate a ratio between the first plurality of dump units and the second plurality of dump units. For instance, the translation table tracking module 802 may calculate a ratio between the total number of dump units associated with a dump group and a number of dump units associated with the dump group not stored in the storage device 110.

Responsive to calculating the ratio between the first plurality of dump units and the second plurality of dump units, the method 1700 can continue by determining 1714 that the ratio satisfies a threshold. In some embodiments, the translation table tracking module 802 may determine a threshold based on a total number of dump units associated with the dump group. For instance, if the ratio is above the threshold, it indicates that the number of dirty entries in the dump group is higher. In some embodiments, the translation table tracking module 802 may determine the threshold as a range. For instance, if the ratio falls in the range, the translation table tracking module 802 determines that the ratio satisfies the threshold.

Lastly, the method 1700 may continue by adding 1716 the dump group to a multi-level linked list based on the ratio. In some embodiments, the multi-level linked list includes a first level linked list and a second level linked list based on the threshold. For instance, the translation table tracking module 802 may determine that the ratio is above the threshold and the translation table tracking module 802 may add the dump group to the first level linked list. In another embodiment, the translation table tracking module 802 may determine that the ratio is below the threshold and the translation table tracking module 802 may add the dump group associated with the ratio to the second level linked list. In one embodiment, the translation table preserving module 804 may receive a request for memory reclaim and the translation table preserving module 804 may select a translation table entry from the first level linked list (ratio above the threshold) for relocation. The operations in step 1716 can be performed by the translation table tracking module 802 in cooperation with one or more other entities of the storage logic 104.

Systems and methods for implementing an efficient data management architecture are described below. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data types (e.g., collections of other resources for example images, audio, web pages).

Reference in the specification to "one embodiment" or "an embodiment" means that a particular feature, structure, or characteristic described in connection with the implementation is included in at least one implementation of the disclosed technologies. The appearances of the phrase "in one embodiment" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operat-

What is claimed is:

1. A method comprising:
receiving a first translation table entry for a logical block;
mapping the first translation table entry to a first dump unit, the first dump unit included in an array of dump units;
identifying a second translation table entry for the logical block in the first dump unit, the second translation table entry being stored in a storage device; and
generating a linked list in the storage device from the second translation table entry associated with the first dump unit, the linked list identifying previous translation table entries associated with the logical block.

2. The method of claim 1, wherein the mapping of the first translation table entry to the first dump unit is based on a hash function, the mapping of the first translation table entry to the first dump unit being a hash of a logical block number of the logical block of the first translation table entry.

3. The method of claim 1, further comprising:
allocating a space in memory for the array of dump units.

4. The method of claim 1, wherein mapping includes storing the first translation table entry in the first dump unit.

5. The method of claim 1, further comprising:
storing the first translation table entry in a logical space in memory.

6. The method of claim 1, wherein the linked list includes updates to the logical block in a reverse chronological order, a most recent update being at a front of the linked list.

7. The method of claim 1, further comprising:
grouping the array of dump units into a plurality of dump groups; and
assigning a fixed range of logical space in memory to each dump group in the plurality of dump groups.

8. The method of claim 1, further comprising:
receiving a write request for the logical block, the write request including a new translation table entry for the logical block;
identifying the first dump unit associated with the logical block;
updating the second translation table entry in the storage device with the first translation table entry from the first dump unit;
storing the new translation table entry in the first dump unit; and
updating the linked list in the storage device, the linked list referencing the first translation table entry in the storage device through previous translation table entries associated with the logical block.

9. The method of claim 1, further comprising:
eliminating duplicate entries for the logical block to get a consolidated representation of translation table entries on the storage device.

10. A system comprising:
a processor; and
a memory storing instructions that, when executed, cause the system to:
receive a first translation table entry for a logical block;
map the first translation table entry to a first dump unit, the first dump unit included in an array of dump units;
identify a second translation table entry for the logical block in the first dump unit, the second translation table entry being stored in a storage device; and
generate a linked list in the storage device from the second translation table entry associated with the first dump unit, the linked list identifying previous translation table entries associated with the logical block.

11. The system of claim 10, wherein the mapping of the first translation table entry to the first dump unit is based on a hash function, the mapping of the first translation table entry to the first dump unit being a hash of a logical block number of the logical block of the first translation table entry.

12. The system of claim 10, further comprising:
allocating a space in memory for the array of dump units.

13. The system of claim 10, wherein mapping includes storing the first translation table entry in the first dump unit.

14. The system of claim 10, further comprising:
storing the first translation table entry in a logical space in memory.

15. The system of claim 10, wherein the linked list includes updates to the logical block in a reverse chronological order, a most recent update being at a front of the linked list.

16. The system of claim 10, further comprising:
grouping the array of dump units into a plurality of dump groups; and
assigning a fixed range of logical space in memory to each dump group in the plurality of dump groups.

17. The system of claim 10, further comprising:
receiving a write request for the logical block, the write request including a new translation table entry for the logical block;
identifying the first dump unit associated with the logical block;
updating the second translation table entry in the storage device with the first translation table entry from the first dump unit;
storing the new translation table entry in the first dump unit; and
updating the linked list in the storage device, the linked list referencing the first translation table entry in the storage device through previous translation table entries associated with the logical block.

18. The system of claim 10, further comprising:
eliminating duplicate entries for the logical block to get a consolidated representation of translation table entries on the storage device.

19. A computer program product comprising a non-transitory computer usable medium including a computer readable program, wherein the computer readable program when executed on a computer causes the computer to:
receive a first translation table entry for a logical block;
map the first translation table entry to a first dump unit, the first dump unit included in an array of dump units;
identify a second translation table entry for the logical block in the first dump unit, the second translation table entry also being stored in a storage device; and
generate a linked list in the storage device from the second translation table entry associated with the first dump unit, the linked list identifying previous translation table entries associated with the logical block.

20. The computer program product of claim 19, wherein mapping includes storing the first translation table entry in the first dump unit.

21. The computer program product of claim 19, wherein the linked list includes updates to the logical block in a reverse chronological order, a most recent update being at a front of the linked list.

22. The computer program product of claim 19, further comprising:
  grouping the array of dump units into a plurality of dump groups; and
  assigning a fixed range of logical space in memory to each dump group in the plurality of dump groups.

23. The computer program product of claim 19, further comprising:
  storing the first translation table entry in a logical space in memory.

\* \* \* \* \*